United States Patent
Akashika

(10) Patent No.: US 10,977,625 B2
(45) Date of Patent: Apr. 13, 2021

(54) MOBILE TERMINAL, METHOD FOR CONTROLLING MOBILE TERMINAL, PROGRAM PRODUCT, AND RECORDING MEDIUM

(75) Inventor: Hideki Akashika, Tokyo (JP)

(73) Assignee: Rakuten, Inc., Tokyo (JP)

( * ) Notice: Subject to any disclaimer, the term of this patent is extended or adjusted under 35 U.S.C. 154(b) by 351 days.

(21) Appl. No.: 14/424,083

(22) PCT Filed: Aug. 31, 2012

(86) PCT No.: PCT/JP2012/072275
§ 371 (c)(1),
(2), (4) Date: Feb. 26, 2015

(87) PCT Pub. No.: WO2014/033939
PCT Pub. Date: Jun. 6, 2014

(65) Prior Publication Data
US 2015/0324763 A1 Nov. 12, 2015

(51) Int. Cl.
*G06Q 20/06* (2012.01)
*G06Q 20/32* (2012.01)
(Continued)

(52) U.S. Cl.
CPC ......... *G06Q 20/065* (2013.01); *G06Q 20/325* (2013.01); *G06Q 20/3226* (2013.01);
(Continued)

(58) Field of Classification Search
USPC .......................................................... 705/41
See application file for complete search history.

(56) References Cited

U.S. PATENT DOCUMENTS 8,181,867 B1 * 5/2012 Bierbaum ............ G06Q 20/405
235/384
8,600,882 B2 * 12/2013 Summerrow .......... G06Q 20/28
705/35

(Continued)

FOREIGN PATENT DOCUMENTS

JP 9-330365 A 12/1997
JP 2004-272560 A 9/2004

(Continued)

OTHER PUBLICATIONS

Narseen Quibria, The Contactless Wave: a Case Study in Transit Payments, Emerging Payments Industry Briefing, Jun. 2008, pp. 14-15 (Year: 2008).*

(Continued)

*Primary Examiner* — Elda G Milef
*Assistant Examiner* — Gregory S Cunningham, II
(74) *Attorney, Agent, or Firm* — Sughrue Mion, PLLC

(57) ABSTRACT

The object of the present invention is to shorten time from when a predetermined condition is satisfied till when recharging is completed. A mobile terminal directly requests an electronic money server to perform recharging. In response to this, the electronic money server secures funds and then generates a command group for recharging. Then, the electronic money server sends, to the mobile terminal, a storage instruction by which the mobile terminal is made to store the generated command group in an IC chip. The mobile terminal then does not immediately execute the command group but temporality stores the command group into a general-purpose IC chip. In this way, a stage of preparation for recharging is completed. Then, under a certain condition (for example, by user's operation, on the side of the general-purpose IC chip, the stored command (Continued)

group is executed. In this way, recharging is performed, and the value balance is updated.

17 Claims, 16 Drawing Sheets

(51) Int. Cl.
*G06Q 20/38* (2012.01)
*G06Q 20/36* (2012.01)

(52) U.S. Cl.
CPC ..... *G06Q 20/3278* (2013.01); *G06Q 20/3672* (2013.01); *G06Q 20/3674* (2013.01); *G06Q 20/3825* (2013.01)

(56) References Cited

U.S. PATENT DOCUMENTS

| | | | | |
|---|---|---|---|---|
| 2004/0254892 A1* | 12/2004 | Adamson | ........... | G06Q 20/3672 705/73 |
| 2007/0156611 A1* | 7/2007 | Gupta | ............... | G06Q 20/3672 705/78 |
| 2008/0244111 A1* | 10/2008 | Tobita | ................ | G06K 19/0719 710/22 |
| 2010/0145850 A1* | 6/2010 | Nagai | ................... | G06Q 20/363 705/41 |
| 2013/0203345 A1* | 8/2013 | Fisher | ................... | H04W 52/02 455/41.1 |

FOREIGN PATENT DOCUMENTS

| | | |
|---|---|---|
| JP | 2005-25618 A | 1/2005 |
| JP | 2006-221462 A | 8/2006 |
| JP | 2008-41025 A | 2/2008 |
| JP | 2010-9432 A | 1/2010 |
| JP | 2012-43329 A | 3/2012 |

OTHER PUBLICATIONS

International Search Report for PCT/JP2012/072275 dated Oct. 9, 2012.

* cited by examiner

Fig.5 (1) USER DB

| USER ID | ELECTRONIC MONEY NUMBER | MANAGEMENT VALUE OF VALUE BALANCE | SETTING OF RE-CHARGING | NAME | ADDRESS | DATE OF BIRTH | TELE-PHONE NUMBER | E-MAIL ADDRESS |
|---|---|---|---|---|---|---|---|---|
| ... | ... | ... | MADE | ... | ... | ... | ... | ... |
| ... | ... | ... | MADE | ... | ... | ... | ... | ... |
| ... | ... | ... | NOT MADE | ... | ... | ... | ... | ... |
| ... | ... | ... | NOT MADE | ... | ... | ... | ... | ... |

Fig.5 (2) RECHARGING REGISTRATION DB

| ELECTRONIC MONEY NUMBER | SETTING OF AUTOMATIC RECHARGING | CREDIT CARD NUMBER | RECHARGING AMOUNT TO BE ADDED BY ONE RECHARGING OPERATION | DAILY LIMIT OF AMOUNT | MONTHLY LIMIT OF AMOUNT | DATE OF RECHARGING | REFERENCE VALUE BALANCE |
|---|---|---|---|---|---|---|---|
| ... | MADE | ... | 10,000 YEN | 10,000 YEN | 40,000YEN | ON THE 25TH OF EACH MONTH | ... |
| ... | MADE | ... | NOT MADE | NOT MADE | NOT MADE | NOT MADE | ... |
| ... | NOT MADE | ... | 5,000 YEN | NOT MADE | NOT MADE | NOT MADE | ... |

Fig.6

RECHARGING SETTING

1. SET A PROCUREMENT SOURCE OF
   RECHARGING FUNDS

- ○ CREDIT CARD
   - ○ WITHDRAWAL FROM A BANK ACCOUNT
   - ○ ADDITION TO THE TELEPHONE BILL

2. SET A RECHARGING AMOUNT TO BE ADDED
   BY ONE RECHARGING OPERATION
   IF YOU DESIRE TO SET THE AMOUNT

▼ 10,000  YEN

3. SET AN UPPER LIMIT OF THE RECHARGING
   AMOUNT IN A PREDETERMINED PERIOD
   IF YOU DESIRE TO SET THE UPPER LIMIT

▼ ONE MONTH

▼ 50,000  WITHIN DETERMINED YEN LIMIT

4. SET A LOWER LIMIT OF A VALUE BALANCE
   AT WHICH RECHARGING IS STARTED

▼ 10,000  PLEASE PERFORM RECHARGING WHEN THE VALUE BALANCE BECOMES DETERMINED YEN OR LESS

SET (234)     RETURN (235)

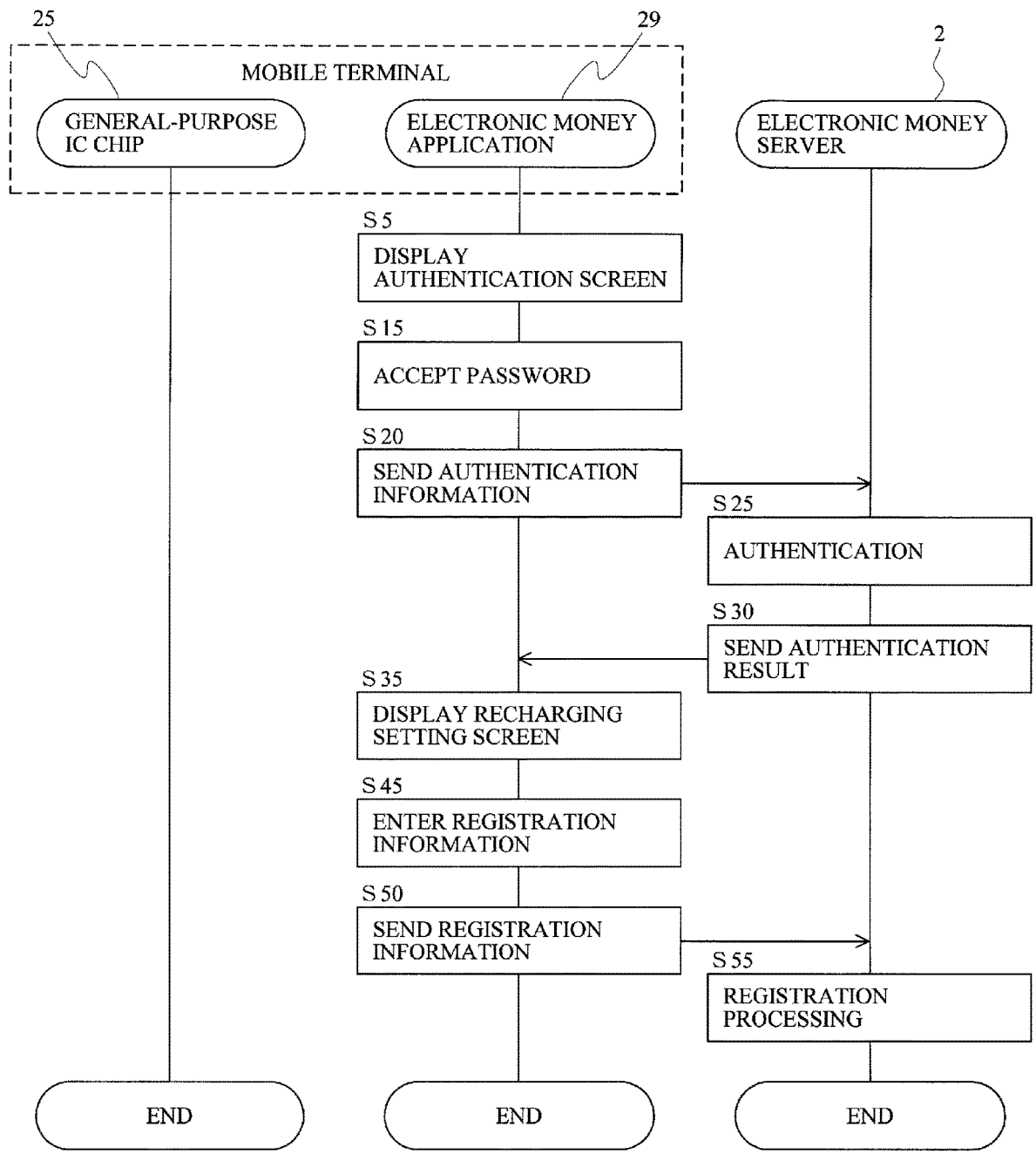

Fig.8

RECHARGING REQUEST

1. ▼ 10,000  PLEASE PERFORM RECHARGING WITH DETERMINED YEN

2. TIME OF EXECUTION OF RECHARGING

○ PLEASE PERFORM RECHARGING IMMEDIATELY
○ PLEASE PREPARE FOR RECHARGING FOR THE TIME BEING

SET — 236

RETURN — 237

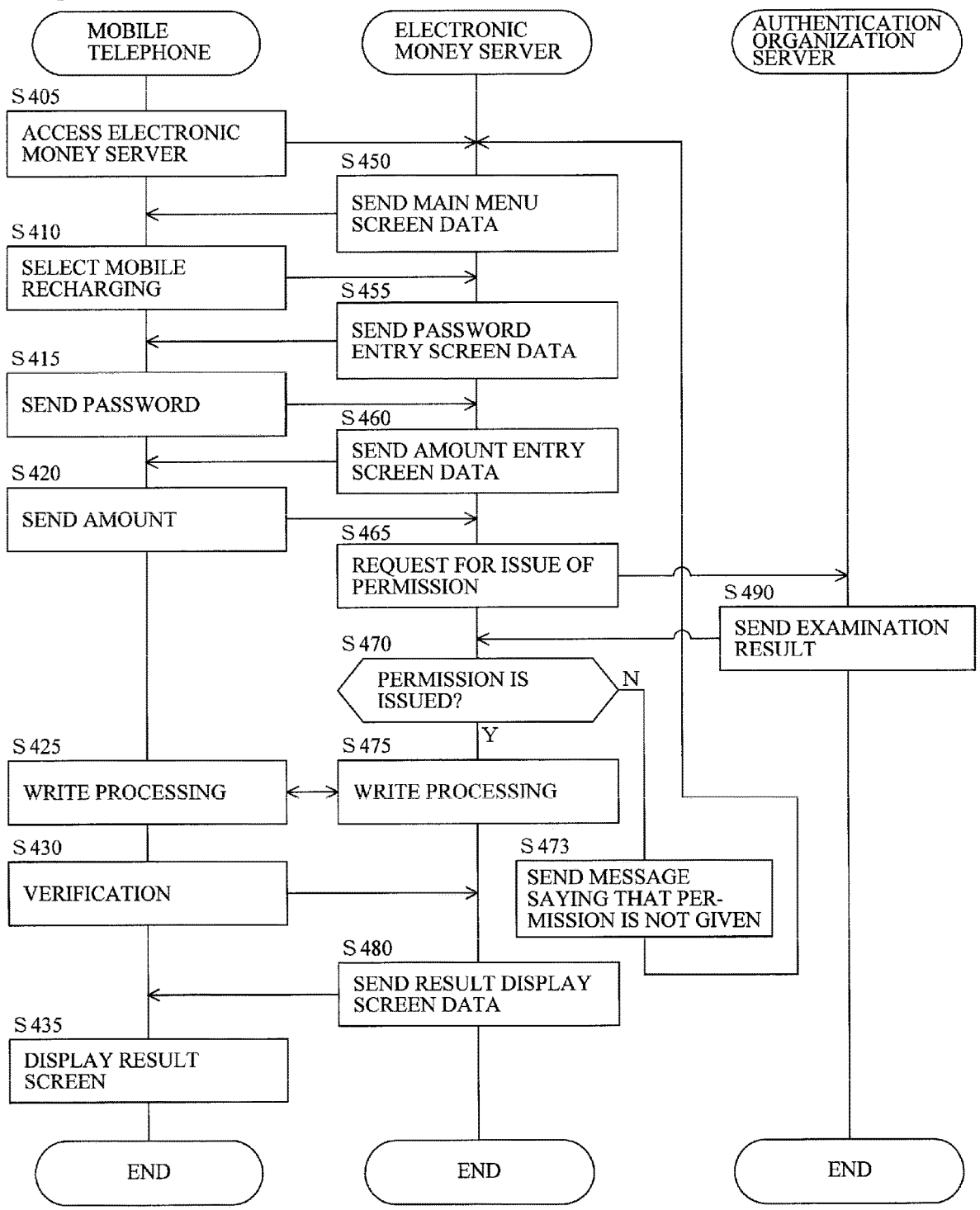

MOBILE TERMINAL, METHOD FOR CONTROLLING MOBILE TERMINAL, PROGRAM PRODUCT, AND RECORDING MEDIUM

CROSS REFERENCE TO RELATED APPLICATIONS

This application is a National Stage of International Application No. PCT/JP2012/072275 filed Aug. 31, 2012, the contents of which are incorporated herein by reference in their entirety.

TECHNICAL FIELD

The present invention relates to mobile terminals, methods for controlling the mobile terminal, program products, and recording media and, for example, relates to what recharges a mobile terminal by using electronic money.

BACKGROUND ART

In recent years, the use of electronic money has become widespread. In electronic money, amount information called value is related to money value and fund settlement is performed by increasing or decreasing the value balance.

FIG. 15 is a diagram for explaining an existing electronic money system.

An electronic money card 90 is an IC card owned by the user, and the balance of value, an IC chip ID by which an IC chip is identified, an electronic money number, and so forth are recorded on a built-in IC chip. Moreover, a mobile terminal 5, such as a mobile telephone, which incorporates the IC chip is also present.

A method of holding value by an IC chip on the user's side as described above is called a stored value type.

An asynchronous payment terminal 7 is installed in a store, an automatic vending machine, and so forth, and performs payment by value by reducing the value balance stored in the IC chip by performing short-distance radio communication (near field radio communication) with the electronic money card 90 or the IC chip of the mobile terminal 5.

The asynchronous payment terminal 7 completes the payment processing locally between the asynchronous payment terminal 7 and the IC chip of the user without connecting to an electronic money server 2 and records the transaction history as log data.

Then, the asynchronous payment terminal 7 collectively sends the log data to the electronic money server 2 later at regular or irregular intervals.

The reason why the asynchronous payment terminal 7 is called "asynchronous" is that the asynchronous payment terminal 7 completes the payment processing locally without being synchronous with the electronic money server 2.

In such a stored value-type electronic money system, since the value balance is stored in the IC chip in advance and the value balance is reduced at the time of payment, if there is not enough value, it is impossible to perform payment. This makes it necessary for processing called recharging that increases the balance of value stored in the IC chip. This recharging is generally performed in exchange for money in a store and the exchange value of value is guaranteed.

In Patent Document 1, a technique of directly recharging an IC chip on the mobile terminal's side without the exchange of money by making access to an electronic money server from a mobile terminal is disclosed.

With reference to FIG. 16, this processing procedure will be described.

First, a mobile telephone is put into Internet connection mode, and access is made to a service site of an electronic money server (step 405). In response to this, the electronic money server sends, to the mobile telephone, screen data for displaying a main menu screen (step 450).

The mobile telephone receives this data and displays the main menu screen on a display. Here, it is assumed that mobile recharging is selected, and the mobile telephone sends, to the electronic money server, information indicating that mobile recharging has been selected (step 410). In response to this, the electronic money server sends, to the mobile telephone, screen data for displaying a password entry screen (step 455). The mobile telephone receives this screen data and displays the password entry screen on the display. The user enters a password on this screen and sends the password to the electronic money server (step 415). After authenticating this password, the electronic money server sends, to the mobile telephone, screen data for displaying an amount entry screen (step 460).

The mobile telephone receives this screen data and displays the amount entry screen on the display. The user enters a recharging amount on this screen and sends the recharging amount to the electronic money server (step 420). The electronic money server requests, from an authentication organization server, permission for issuing value to this user (step 465), and the authentication organization server sends the examination result to the electronic money server (step 490).

If permission is not issued (step 470; N), the electronic money server sends, to the mobile telephone, a message saying that permission is not issued (step 473) and goes back to step 450. On the other hand, if permission is issued (step 470; Y), the electronic money server performs communication with the mobile telephone and performs value write processing (step 475, step 425). In the mobile telephone, when writing of value is finished, the user verifies it and sends, to the electronic money server, a signal that verification has been performed (step 430). In response to this, the electronic money server sends, to the mobile telephone, screen data for displaying a result display screen indicating that mobile recharging has been finished (step 480) and ends the processing.

In the mobile telephone, the mobile telephone displays the result display screen on the display by using this and ends the processing (step 435).

CITATION LIST

Patent Literature

Patent Document 1: JP-A-2004-272560

DISCLOSURE OF INVENTION

Problem to be Solved by the Invention

In the technique described in Patent Document 1, the exchange of data between a mobile telephone and an electronic money server is incorporated into the processing procedure for performing recharging. Therefore, it takes reasonable time before the completion of recharging after the user starts recharging.

A problem to be solved by the present invention is to shorten time from when a predetermined condition is satisfied till when recharging is completed.

SUMMARY OF THE INVENTION

The invention described in claim 1 provides a mobile terminal that is connectable to an IC chip having a balance storing unit that stores a balance of electronic value and a balance changing unit that performs change processing which changes the balance which is stored in the balance storing unit by using balance change information, the mobile terminal comprising: an acquiring unit that acquires, from an information processing server, a storage instruction that makes an IC chip's-side storing unit store balance change information which increases the balance which is stored in the balance storing unit; a transferring unit that transfers the storage instruction to the IC chip such that the balance change information is stored in the IC chip's-side storing unit in accordance with the storage instruction acquired by the acquiring unit; and an instructing unit that outputs, to the IC chip with predetermined timing, an execution instruction that causes the change processing to be performed by using the balance change information which is stored in the IC chip's-side storing unit.

The invention described in claim 2 provides the mobile terminal according to claim 1, wherein the instructing unit outputs, to the IC chip with predetermined timing, an execution instruction that causes the change processing to be performed by using the balance change information which is stored in the IC chip's-side storing unit and causes the balance change information which is stored in the IC chip's-side storing unit to be invalidated.

The invention described in claim 3 provides the mobile terminal according to claim 1 or 2, further comprising: a storage unit that makes a mobile terminal's-side storing unit store the balance change information when the balance change information is not stored in the IC chip's-side storing unit in accordance with the storage instruction which is transferred by the transferring unit, wherein the instructing unit further outputs the balance change information which is stored in the mobile terminal's-side storing unit to the IC chip.

The invention described in claim 4 provides the mobile terminal according to claim 3, further comprising: an invalidating unit that temporarily invalidates the IC chip; and a releasing unit that releases temporary invalidation of the IC chip by the invalidating unit, wherein the storage unit makes the mobile terminal's-side storing unit store balance change information designated in the storage instruction which is acquired by the acquiring unit if the IC chip is invalidated by the invalidating unit, and the instructing unit outputs the execution instruction at a time when the invalidation of the IC chip is released by the releasing unit.

The invention described in claim 5 provides the mobile terminal according to any one of claims 1 to 4, further comprising: a unit that makes a display screen display an object related to an amount to be changed by change processing using the balance change information which is acquired by the acquiring unit, wherein the instructing unit outputs the execution instruction to the IC chip at a time when a predetermined operation for the object displayed on the display screen is detected.

The invention described in claim 6 provides the mobile terminal according to any one of claims 1 to 4, further comprising: a unit that makes a notification area display notification data including an amount to be changed by change processing using the balance change information which is acquired by the acquiring unit, wherein the instructing unit outputs the execution instruction to the IC chip at a time when a predetermined operation for the notification data displayed in the notification area is detected.

The invention described in claim 7 provides the mobile terminal according to any one of claims 1 to 6, wherein the IC chip further includes a unit that makes the IC chip's-side storing unit store log data including an execution result of the change processing performed by the balance changing unit and a unit that sends the log data which is stored in the IC chip's-side storing unit to the information processing server.

The invention described in claim 8 provides the mobile terminal according to any one of claims 1 to 7, wherein the balance change information includes an addition amount to be added to the balance which is stored in the balance storing unit, a command that acquires the balance which is stored in the balance storing unit, and a command that changes the balance which is stored in the balance storing unit to a value obtained by adding the addition amount to the balance which is acquired.

The invention described in claim 9 provides a method for controlling a mobile terminal which is connectable to an IC chip having a balance storing unit that stores a balance of electronic value and a balance changing unit that performs change processing which changes the balance which is stored in the balance storing unit by using balance change information, the method comprising: an acquiring step of acquiring, from an information processing server, a storage instruction that makes an IC chip's-side storing unit store balance change information which increases the balance which is stored in the balance storing unit; a transferring step of transferring the storage instruction to the IC chip such that the balance change information is stored in the chip's-side storing unit in accordance with the storage instruction which is acquired in the acquiring step; and an instructing step of outputting, to the IC chip with predetermined timing, an execution instruction that causes the change processing to be performed by using the balance change information which is stored in the IC chip's-side storing unit.

The invention described in claim 10 provides program product for making a mobile terminal which is connectable to an IC chip having a balance storing unit that stores a balance of electronic value and a balance changing unit that performs change processing which changes the balance which is stored in the balance storing unit by using balance change information implement: an acquiring function of acquiring, from an information processing server, a storage instruction that makes an IC chip's-side storing unit store balance change information which increases the balance which is stored in the balance storing unit; a transferring function of transferring the storage instruction to the IC chip such that the balance change information is stored in the chip's-side storing unit in accordance with the storage instruction which is acquired by the acquiring function; and an instructing function of outputting, to the IC chip with predetermined timing, an execution instruction that causes the change processing to be performed by using the balance change information which is stored in the IC chip's-side storing unit.

The invention described in claim 11 provides a computer-readable recording medium on which a program product is recorded, the program product making a mobile terminal which is connectable to an IC chip having a balance storing unit that stores a balance of electronic value and a balance changing unit that performs change processing which changes the balance which is stored in the balance storing unit by using balance change information implement: an acquiring function of acquiring, from an information processing server, a storage instruction that makes an IC chip's-side storing unit store balance change information which increases the balance which is stored in the balance storing unit; a transferring function of transferring the storage instruction to the IC chip such that the balance change information is stored in the chip's-side storing unit in accordance with the storage instruction which is acquired by the acquiring function; and an instructing function of outputting, to the IC chip with predetermined timing, an execution instruction that causes the change processing to be performed by using the balance change information which is stored in the IC chip's-side storing unit.

Effect of the Invention

A mobile terminal of the present invention creates in advance a state in which recharging is possible, the state just before recharging is performed, and completes recharging without accessing an information processing server when a predetermined condition is satisfied.

Therefore, according to the present invention, time from when a predetermined condition is satisfied till when recharging is completed is shortened.

BRIEF DESCRIPTION OF DRAWINGS

FIG. 5 is a diagram for explaining a user DB and a recharging registration DB of the electronic money server;

FIG. 6 is a diagram depicting an example of a recharging setting screen;

FIG. 7 is a flowchart depicting the procedure of recharging registration processing;

FIG. 8 is a diagram depicting an example of a recharging request screen;

FIG. 16 is a flowchart for explaining existing recharging processing using a mobile terminal.

DESCRIPTION OF EMBODIMENTS (1) Outline of an Embodiment

A mobile terminal 5 (FIG. 1) directly requests an electronic money server 2 to perform recharging. In response to this, the electronic money server 2 secures funds by accessing a credit company server 300 or the like and then generates a command group for recharging. Then, the electronic money server 2 sends, to the mobile terminal 5, a storage instruction by which the mobile terminal 5 is made to store the generated command group in an IC chip. The mobile terminal 5 that has received the storage instruction stores a command group designated by the received storage instruction in a general-purpose IC chip 25. In this way, a stage of preparation for recharging is completed.

Then, under a certain condition (for example, by user's operation (manual operation) or automatically), on the side of the general-purpose IC chip 25, the stored command group is executed.

In this way, recharging is performed, and the value balance is updated.

As described above, by performing the stage of preparation for recharging in advance, it is possible to perform recharging immediately after a predetermined condition is satisfied.

In a first embodiment, when recharging is performed, if a recharging amount exceeds an upper limit, a stage of preparation for recharging is performed for the time being, and recharging can be performed immediately after the state enters a state in which the recharging amount does not exceed the upper limit even when recharging is performed.

In a second embodiment, a stage of preparation for recharging is performed automatically (the same processing as automatic recharging), and only final execution of recharging is carried out based on the user's intention (operation). This makes it possible to ensure convenience by automatic recharging and, at the same time, avoid the risk of performing recharging without allowing the user to be concerned with the execution of recharging.

In a third embodiment, a stage of preparation for recharging is performed automatically, and prepared recharging is performed automatically when a release of the lock to the general-purpose IC chip 25 is detected. As a result, since recharging is completed immediately after the lock to the general-purpose IC chip 25 is released for payment, it is possible to prevent a situation in which payment cannot be performed due to lack of a value balance at the time of payment.

(2) Details of the Embodiment

Figure 1:
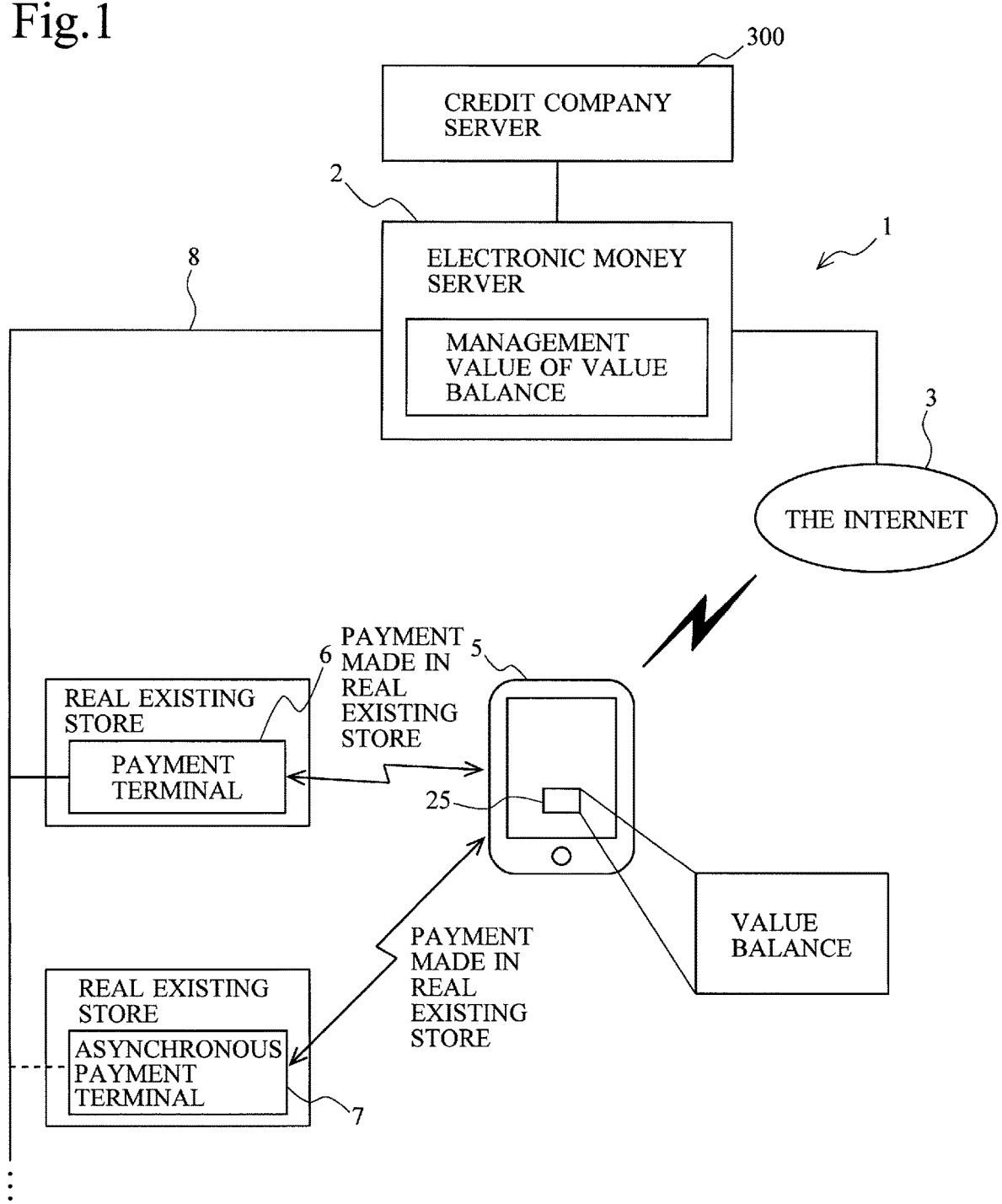
FIG. 1 is a diagram for explaining the network configuration of an electronic money system according to this embodiment.

FIG. 1 is a diagram for explaining the network configuration of an electronic money system 1 according to a first embodiment.

The electronic money system 1 is configured by using the electronic money server 2, the Internet 3, the mobile terminal 5, a payment terminal 6, an asynchronous payment terminal 7, a communication line 8, the credit company server 300, and so forth.

The electronic money server 2 is a server that manages the transfer of money value by value. Here, value is electronic information related to money value, and the electronic money system 1 transfers money value by increasing or decreasing the balance of value (hereinafter, a value balance).

In addition, a business entity of the electronic money system 1 relates the transfer of value to the transfer of actual money by transferring actual money in response to the transfer of value.

The electronic money server 2 stores a management value of a value balance in a state in which the management value is related to the mobile terminal 5 for management. As will be described later, the mobile terminal 5 stores a value balance in the mobile terminal 5.

It is preferable that they are the same value as a result of being always synchronized with each other. However, in actuality, there are a large number of asynchronous payment terminals 7 that cannot establish real-time connection to the electronic money server 2. Therefore, the generated log data is sent to the electronic money server 2 later by batch processing to make them in synchronism with each other ex post facto.

The mobile terminal 5 is a mobile terminal formed as, for example, a smartphone, a mobile telephone, a game console, a tablet computer, or the like and has the function of connecting to the electronic money server 2 via the Internet 3 by way of the mobile telephone network in the case of the smartphone and the mobile telephone and by way of a wireless LAN (local-area network), for example, in the case of the game console and the tablet computer and the function of connecting to the payment terminal 6 and the asynchronous payment terminal 7 by short-distance radio communication.

The mobile terminal 5 incorporates the general-purpose IC chip 25 and stores an electronic money number and a value balance therein.

The payment terminal 6 performs short-distance radio communication with the mobile terminal 5 and also performs communication with the electronic money server 2 via the communication line 8, thereby sending information such as a payment amount to the electronic money server 2 and relaying the communication between the electronic money server 2 and the mobile terminal 5. The payment terminal 6 is a synchronous payment terminal that performs online communication with the electronic money server 2 in real time at the time of payment using the mobile terminal 5.

The payment terminal 6 is installed in an accounting counter, an automatic vending machine, or the like of a real existing store (a real existing store that is physically open in a real existing store or the like) such as a convenience store.

The communication line 8 is a line that connects the electronic money server 2 with the payment terminal 6. As the communication line 8, a dedicated line can be used, and a general-purpose line such as the Internet 3 may also be used.

The asynchronous payment terminal 7 is installed in, for example, a store and an automatic vending machine with inconvenient network equipment and has the function of performing short-distance radio communication with the mobile terminal 5.

The asynchronous payment terminal 7 makes payment by using the value balance by performing short-distance radio communication with the mobile terminal 5. The asynchronous payment terminal 7 is usually not connected to the electronic money server 2 (therefore cannot make payment by using server management-type electronic money) and temporarily stores the details of payment performed between the asynchronous payment terminal 7 and the mobile terminal 5 as log data.

Then, the asynchronous payment terminal 7 connects to the electronic money server 2 around once a day by using the communication line 8 and sends the log data to the electronic money server 2. In an environment with no network communication equipment, a person in charge sometimes manually collects a recording medium on which the log data is recorded.

As for the value balance, the electronic money server 2 manages the fund transfer based on the log data in the payment terminal 6 and the asynchronous payment terminal 7.

The credit company server 300 is a server used by a credit company to manage payment by credit card. When the electronic money server 2 recharges the general-purpose IC chip 25, the credit company server 300 makes payment for recharging by using a credit number of the user.

Figure 2:
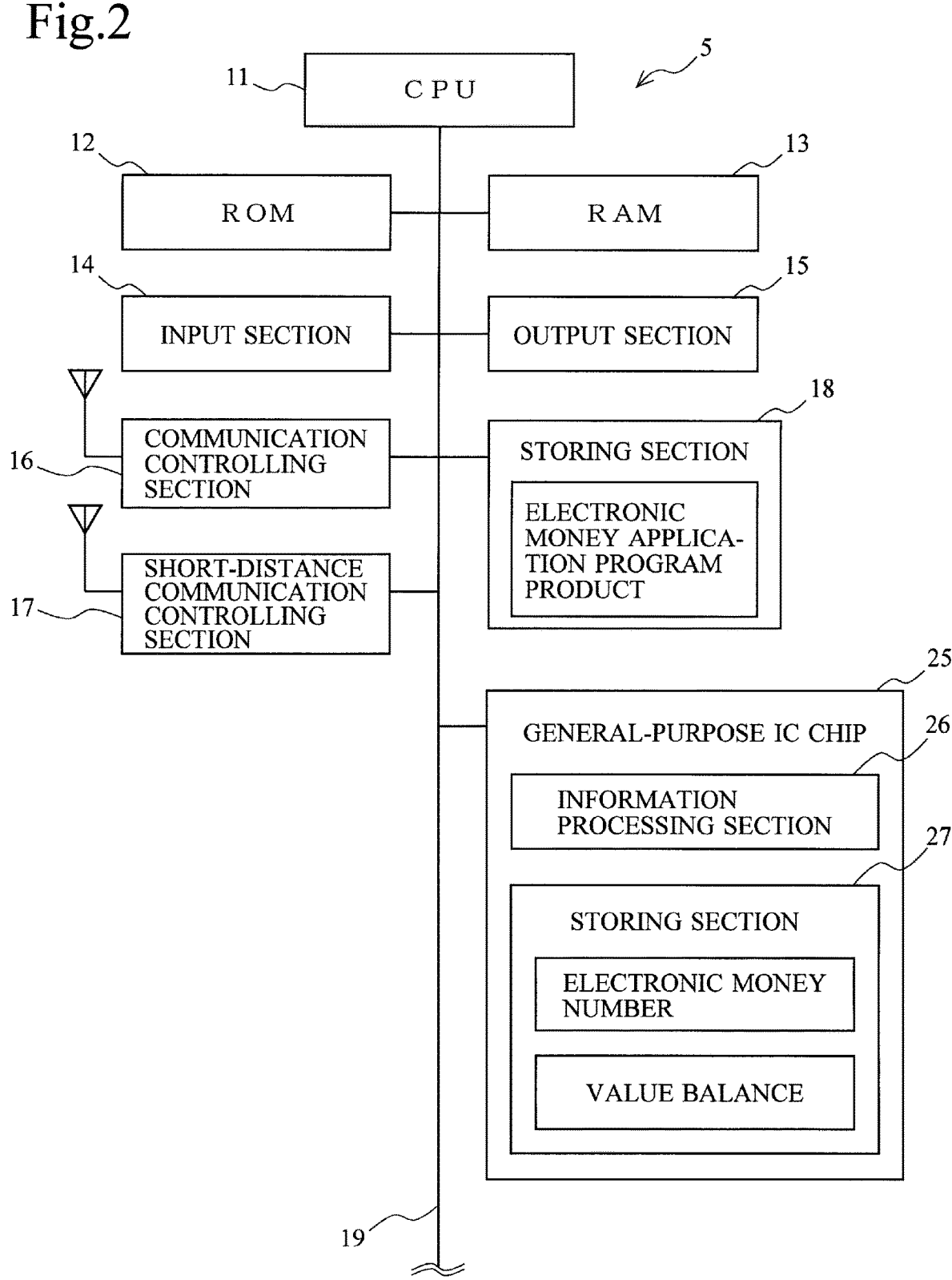
FIG. 2 is a diagram for explaining the hardware configuration of a mobile terminal.

FIG. 2 is a diagram depicting the hardware configuration of the mobile terminal 5. Here, as an example, it is assumed that the mobile terminal 5 is a smartphone, but the same goes for a mobile telephone.

The mobile terminal 5 is formed of a CPU (Central Processing Unit) 11, ROM (Read Only Memory) 12, RAM (Random Access Memory) 13, an input section 14, an output section 15, a communication controlling section 16, a short-distance communication controlling section 17, a storing section 18, the general-purpose IC chip 25, and so forth which are connected to one another by a bus line 19.

The CPU 11 performs various kinds of information processing and overall control of the mobile terminal 5 by executing a program product recorded on the ROM 12 and the storing section 18. In this embodiment, for example, the CPU 11 supports payment processing using the value balance by cooperating with the electronic money server 2 by the function provided by an electronic money application program product which will be described later.

The ROM 12 is read-only memory, and a basic program product used by the mobile terminal 5 to operate, a parameter, data, and so forth are recorded thereon.

The RAM 13 is readable/writable memory and offers working memory used when the CPU 11 performs information processing.

The output section 15 is a functional section that outputs information to the user and is provided with a liquid crystal display for screen display, a speaker from which sound is output, and so forth. On the liquid crystal display, for example, an icon for starting the electronic money application program product is displayed.

The input section 14 is a functional section that inputs information from the outside and is provided with a touch panel installed on the liquid crystal display, a microphone that inputs sound, a camera that takes an image of a subject, and so forth. By touching the touch panel in response to the display on the liquid crystal display, the user can enter information.

The storing section 18 is formed by using, for example, a recording medium such as an EEPROM (Electrically Erasable and Programmable ROM) and a hard disk, and an OS (Operating System) which is a basic program product that controls the mobile terminal 5, the electronic money application program product that supports payment by value, and other program products and data are recorded thereon.

The communication controlling section 16 includes an antenna for performing radio communication with a base station antenna of the mobile telephone network and connects the mobile terminal 5 to the Internet 3 or a telephone line. The mobile terminal 5 can perform communication with the electronic money server 2 through the communication controlling section 16 via the Internet 3.

Incidentally, the game console and the tablet computer usually do not have the function of performing radio communication with the base station antenna of the mobile telephone network and often has only the function of performing radio communication with an access point of the wireless LAN.

Moreover, the smartphone also has the function of performing radio communication with the access point of the wireless LAN.

The short-distance communication controlling section 17 includes an antenna for performing short-distance radio communication with reader/writers of the payment terminal 6 and the asynchronous payment terminal 7 and connects the general-purpose IC chip 25 to the payment terminal 6 and the asynchronous payment terminal 7. In addition to performing communication with the payment terminal 6 via the short-distance communication controlling section 17, the general-purpose IC chip 25 can perform communication with the electronic money server 2 via the mobile terminal 5.

The general-purpose IC chip 25 is an IC chip that stores a general-purpose application and is incorporated into the mobile terminal 5. The user can download an application and stores the application in the general-purpose IC chip 25.

The general-purpose IC chip 25 is formed of a CPU, RAM, ROM, and so forth and is provided with an information processing section 26 that performs information processing in accordance with various program products and a storing section 27 formed of nonvolatile memory.

In the storing section 27, an electronic money number and a value balance and, though not depicted in the drawing, a value operation program product used by the information processing section 26 to operate the value balance, authentication data used by the electronic money server 2 to authenticate the general-purpose IC chip 25, and so forth are stored.

The electronic money number is a number used by the electronic money server 2 to identify the user of the mobile terminal 5 (the general-purpose IC chip 25).

Reduction processing and increase processing related to the value balance in the general-purpose IC chip 25 are performed by the value operation program product formed in the information processing section 26 in the general-purpose IC chip 25 in accordance with an instruction from the outside. This is performed in order to increase security by limiting processing of the value balance to the inside of the general-purpose IC chip 25.

Incidentally, as for processing of the value balance, information to be input to the general-purpose IC chip 25 is encrypted and is decoded in the general-purpose IC chip 25, and the information to be output from the general-purpose IC chip 25 is output after being encrypted in these chips.

Figure 3:
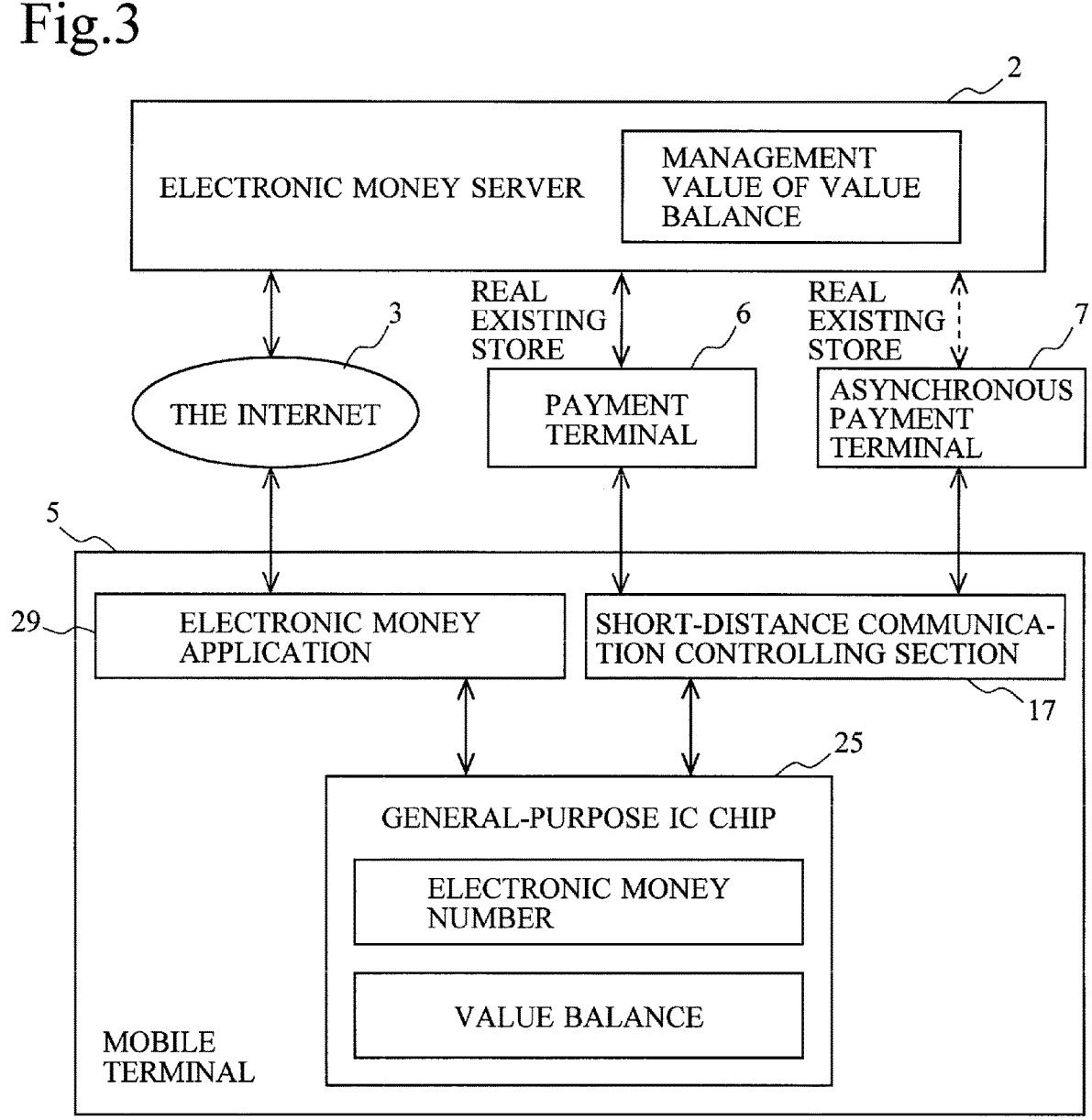
FIG. 3 is a diagram for explaining the function of the mobile terminal.

FIG. 3 is a diagram for explaining the function of the mobile terminal 5.

When the electronic money application program product is executed, an electronic money application 29 is formed in the mobile terminal 5.

In the case of payment in a real existing store provided with the payment terminal 6, the short-distance communication controlling section 17 performs communication with the payment terminal 6 and performs communication with the electronic money server 2 via the payment terminal 6.

In the case of payment in a real existing store provided with the asynchronous payment terminal 7, the short-distance communication controlling section 17 performs communication with the asynchronous payment terminal 7.

Moreover, the electronic money application 29 can access the general-purpose IC chip 25.

In the case of payment in a real existing store, the short-distance communication controlling section 17 can increase or decrease the value balance and read the electronic money number by operating the value operation program product in the general-purpose IC chip 25.

Then, when payment processing is performed, the general-purpose IC chip 25 receives, via the short-distance communication controlling section 17, a request from the asynchronous payment terminal 7 to update (reduce) the value balance and updates (reduces) the value balance.

As the value balance update processing that is performed here, the following methods are possible.

(Method 1) A case where an overwriting instruction is sent as a value balance update request.

In this case, the asynchronous payment terminal 7 subtracts a payment amount from the value balance received from the CPU of the general-purpose IC chip 25 of the mobile terminal 5 and calculates the balance after subtraction. Then, the asynchronous payment terminal 7 sends, as a value balance update request, an overwriting instruction by which overwriting is performed on the balance after calculation. The CPU of the general-purpose IC chip 25 of the mobile terminal 5 performs update by performing overwriting with the value balance in accordance with the overwriting instruction.

Then, the general-purpose IC chip 25 notifies the asynchronous payment terminal 7 of the update of the value balance.

(Method 2) A case where a subtraction instruction is sent as the value balance update request.

In this case, the asynchronous payment terminal 7 sends a subtraction instruction by which a payment amount is subtracted from the value balance to the CPU of the general-purpose IC chip 25 of the mobile terminal 5 as the value balance update request. The CPU of the general-purpose IC chip 25 of the mobile terminal 5 updates the value balance by subtracting the payment amount from the value balance in accordance with the instruction.

Then, the general-purpose IC chip 25 notifies the asynchronous payment terminal 7 of the update of the value balance.

On the other hand, when recharging processing is performed in a real existing store, the general-purpose IC chip 25 receives, via the short-distance communication controlling section 17, a request from the asynchronous payment terminal 7 to update (increase) the value balance and updates (increases) the value balance.

Then, the general-purpose IC chip 25 notifies the asynchronous payment terminal 7 of the update of the value balance.

Incidentally, this recharging is based on the premise that a store clerk of the store in which the asynchronous payment terminal 7 is installed has received money corresponding to value by which recharging is performed.

In this recharging, recharging can be performed directly from the electronic money server 2 without the asynchronous payment terminal 7. In this case, access is made to the electronic money server 2 via the communication controlling section 16 of the mobile terminal 5, and the procedures such as user authentication processing, permission from the authentication organization server such as the credit company server 300, and so forth are executed. Then, the mobile terminal 5 receives amount update (increase) information from the electronic money server 2, and the general-purpose IC chip 25 updates (increases) the value balance.

This recharging from the electronic money server 2 is performed as a series of processing.

Making settings such that this recharging from the electronic money server 2 is performed automatically under a certain condition (for example, when the value balance becomes smaller than or equal to a predetermined value) is referred to as automatic recharging.

Figure 4:
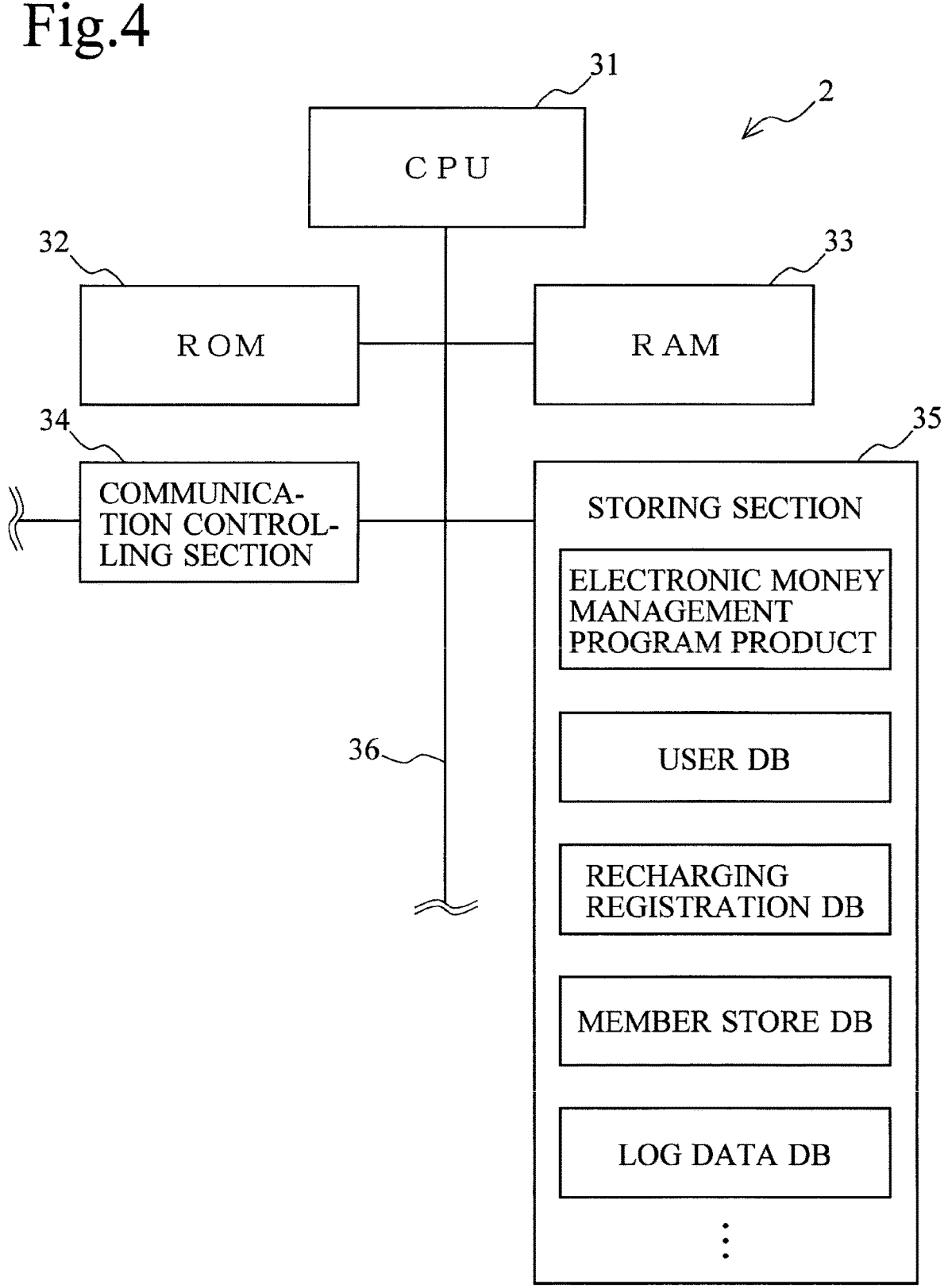
FIG. 4 is a diagram for explaining the configuration of an electronic money server.

FIG. 4 is a diagram for explaining the configuration of the electronic money server 2.

The electronic money server 2 is formed of a CPU 31, ROM 32, RAM 33, a communication controlling section 34, a storing section 35, and so forth which are connected to one another via a bus line 36.

The CPU 31 performs various kinds of information processing and overall control of the electronic money server 2 by executing the program product stored in the ROM 32 and the storing section 35. In this embodiment, the CPU 31 receives a recharging request from the mobile terminal 5 and performs recharging.

In payment with the asynchronous payment terminal 7, the electronic money server 2 processes the payment by receiving, from the asynchronous payment terminal 7 at a later time, the log data of the update of the value balance performed by the asynchronous payment terminal 7.

In the case of the payment terminal 6 that can be connected to the electronic money server 2 online, it is possible to perform payment processing by value by updating the value balance in real time while performing communication.

The ROM 32 is read-only memory, and a basic program product used by the electronic money server 2 to operate, a parameter, data, and so forth are recorded thereon.

The RAM 33 is readable/writable memory and offers working memory used when the CPU 31 performs information processing.

The communication controlling section 34 controls communication which the electronic money server 2 performs with the payment terminal 6, the asynchronous payment terminal 7, and the mobile terminal 5 via the communication line 8 and communication which the electronic money server 2 performs with the mobile terminal 5 via the Internet 3.

The storing section 35 is formed of, for example, a large-capacity hard disk, and an electronic money management program product and other program products which are used by the CPU 31 to perform payment processing by value and perform recharging, a user DB (database) managing a user's value balance and the history of recharging, a member store DB managing value payment performed in a member store, a log data DB storing log data of each payment processing, and so forth are recorded thereon.

Incidentally, in this example of FIG. 4, a single electronic money server 2 has been described, but this electronic money server 2 may be formed of a plurality of servers by distributing the function.

Next, by using the drawings of FIG. 5, the databases of the electronic money server 2 will be described.

FIG. 5(1) is a diagram for explaining the logical configuration of the user DB.

In this embodiment, an electronic money number is stored in a state in which the electronic money number is related to a user ID. Though not depicted in the drawing, items such as authentication data of the general-purpose IC chip 25 are also stored.

An item "user ID" is user identification information.

An item "electronic money number" is an account number for distinguishing a value balance from the value balances of other users.

An item "management value of a value balance" is a value balance of the account identified by the item "electronic money number". This value balance is updated by using the received log data.

An item "setting of recharging" is an item for making an entry as to whether or not setting of recharging from the electronic money server 2 has been made.

"Name", "address", "date of birth", "telephone number", and "e-mail address" are information for identifying a user. All of these articles are not required registration items and may not be provided in some cases.

FIG. 5(2) is a diagram for explaining the logical configuration of a recharging registration DB.

The recharging registration DB is formed of "electronic money number", "setting of automatic recharging", "credit card number", "recharging amount to be added by one recharging operation", "daily limit of amount", "monthly limit of amount", "date of recharging", and other items.

The item "electronic money number" is used as a key in searching for a user registered in the user DB.

The item "setting of automatic recharging" is an item indicating that the user has made not only setting of recharging from the electronic money server 2 but also setting of "automatic recharging".

The "credit card number" is an item indicating the procurement source of recharging funds. Therefore, in some cases, "account number of a financial institution" or "ID determined by a telephone company which collects the telephone bill" is used.

When a plurality of payment means (a credit card, a deposit and savings account, and so forth) are used, the payment procedure can also be stored.

A withdrawal from a bank account is predicated on the presence of a contract between the user and a bank to make a withdrawal upon request from the electronic money server 2.

The items "recharging amount to be added by one recharging operation", "daily limit of amount", "monthly limit of amount", "date of recharging", and "reference value balance" are arbitrary setting items. When the user makes a request to make settings, these items are recorded.

Here, the recharging amount to be added by one recharging operation is the amount that is added to the general-purpose IC chip 25 of the mobile terminal 5 by one recharging operation. This setting eliminates the need to set the amount every time recharging is performed.

The daily limit of amount is the upper limit of the total recharging amount per day by recharging.

The monthly limit of amount is the upper limit of the total recharging amount per month by one recharging operation. Moreover, a configuration may be adopted in which ceilings are set on the number of times per day and the number of times per month.

The date of actual recharging is a date of a time of a day if setting of a time of a day at which recharging can be performed is desired.

The reference value balance is a value balance used as a reference: when the value balance falls below this reference value balance, new recharging is performed. For example, a configuration may also be adopted in which recharging processing is urged by e-mail from the electronic money server 2 when the value balance falls below this reference value balance.

Moreover, when automatic recharging is set, recharging is performed automatically when the value balance falls below this reference value balance.

Here, a case where the recharging funds are added to the telephone bill will be described.

When the mobile terminal 5 has the telephone function and the user has made a contract with a mobile telephone company, it is also possible to add up the recharging amount and the telephone bill and charge the user to be billed.

This method is the same as a case where the purchase price of a digital content, for example, is added to the telephone bill.

In this case, the electronic money server 2 accesses a server of a mobile telephone business operator in place of the credit company server 300 and asks the server to collect the automatic recharging amount. At this time, the electronic money server 2 also notifies it of the ID received from the mobile telephone business operator in advance.

FIG. 6 is a diagram depicting a recharging setting screen from the electronic money server 2, the recharging setting screen which is displayed on the mobile terminal 5. Recharging from the electronic money server 2 according to this embodiment is predicated on the presence of user registration made in the electronic money server 2 in advance. This is because, unlike recharging based on cash (money) which is performed in a store, it is necessary to make it clear in advance how to procure the funds for recharging.

This recharging setting screen from the electronic money server 2 is displayed by the electronic money application 29 by accessing the electronic money server 2.

Incidentally, in addition to that described above, as the screen provided to the mobile terminal 5 by the electronic money server 2, there are various screens such as a user registration screen and a recharging request screen.

On the "recharging setting" screen from the electronic money server 2, under the display of "1. Set a procurement source of recharging funds", "a. credit card", "b. withdrawal from a bank account", and "c. addition to the telephone bill" are displayed.

If there are other methods to secure funds, they are also displayed. Then, a selection made by the user from among them is received. The order of precedence may be set by making the user select multiple methods from among them.

Next, "2. Set a recharging amount to be added by one recharging operation if you desire to set the amount" is displayed.

This is an arbitrary setting article. This setting saves the trouble of entering a recharging amount every time a request for recharging is made to the electronic money server 2.

This field (the same goes for the following 3 and 4) is configured as a drop-down menu, and the user selects an amount. Incidentally, it can also be configured so as to allow the user to enter an arbitrary amount.

Next, "3. Set an upper limit of the recharging amount in a predetermined period if you desire to set the upper limit" is displayed. This is also an arbitrary setting article. For example, setting is made such as "one day, within 10,000 yen limit" or "one month, within 50,000 yen limit".

By making this setting, even when the mobile terminal is stolen, it is possible to prevent the damage from spreading by successive recharging operations.

Next, "4. Set a lower limit of a value balance at which recharging is started" is displayed. This is also an arbitrary setting article.

When the value balance falls below the set lower limit, for example, notification may be provided from the electronic money server 2 by e-mail or the electronic money application 29 may display a message to that effect on a display screen of the mobile terminal 5.

Furthermore, below each field described above, a set button 234 and a return button 235 are displayed.

The set button 234 is a button for notifying the electronic money server 2 of the contents selected by the user, and, when the set button 234 is selected, the electronic money application 29 sends the contents set by the user to the electronic money server 2.

The return button 235 is a button for returning to the screen displayed before the display of the recharging setting screen.

FIG. 7 is a flowchart for explaining the procedure for making registration of use of recharging from the electronic money server 2.

The following processing is performed by the CPU implemented in the general-purpose IC chip 25 of the mobile terminal 5, the CPU 11 implemented in the mobile terminal 5, and the CPU 31 of the electronic money server 2 in accordance with an application program product for electronic money processing, a program product of the electronic money application 29, and a program product for the electronic money server.

First, the electronic money application 29 accesses the electronic money server 2 by the operation of the user. Then, the electronic money server 2 sends top screen data to the electronic money application 29, and the electronic money application 29 displays a top screen by using it. On the top screen, a button for recharging setting is displayed.

When the user selects the button for recharging setting, the electronic money application 29 displays an authentication screen on the display (step 5).

Incidentally, a configuration can also be adopted in which the mobile terminal 5 requests authentication screen data from the electronic money server 2 and displays the authentication screen by using the authentication screen data sent from the electronic money server 2 in response thereto.

On the authentication screen, a password entry field and a send button are provided, and, when the user enters a password in the password entry field, the electronic money application 29 accepts the password and temporarily stores the password in the RAM 13 or the like (step 15).

Then, when the user selects the send button, the electronic money application 29 inputs an ID reference command to the general-purpose IC chip 25, reads the electronic money number from the general-purpose IC chip 25, and sends the password stored in the RAM 13 and the electronic money number to the electronic money server 2 as authentication information (step 20).

When receiving the authentication information from the electronic money application 29, the electronic money server 2 performs authentication by comparing it with the password and the electronic money number stored in the user DB (step 25) and sends the authentication result to the electronic money application 29 (step 30).

When receiving the authentication result from the electronic money server 2, the electronic money application 29 displays an authentication result screen by using it.

If the electronic money server 2 has unsuccessfully authenticated the user, on the authentication result screen, the contents giving notice of an authentication error are displayed, and the user cannot perform setting of recharging.

On the other hand, if the electronic money server 2 has successfully authenticated the user, on the authentication result screen, regulations in getting recharging service and an agree button for entering an intention of agreeing to the regulations are displayed.

Incidentally, a configuration can be adopted in which the display of regulations and agreement thereto are performed at the time of an initial operation or when the regulations are revised.

When the user selects the agree button, the electronic money application 29 displays the recharging setting screen depicted in FIG. 6 (step 35).

Incidentally, a configuration can also be adopted in which the mobile terminal 5 requests recharging setting screen data from the electronic money server 2 and displays the recharging setting screen by using the recharging setting screen data sent from the electronic money server 2 in response thereto.

The electronic money application 29 accepts an entry of registration information (the procurement source of recharging funds, the recharging amount to be added by one recharging operation, the setting of an upper limit of recharging, and the lower limit of the value balance) as a result of the user selecting various conditions from the recharging setting screen (step 45).

When the user selects the set button 234 (FIG. 6), the electronic money application 29 sends the registration information to the electronic money server 2 (step 50). At this time, the electronic money application 29 stores the lower limit of the value balance in the RAM 13 or the like in order to use the lower limit of the value balance later in checking the value balance.

The electronic money server 2 receives the registration information from the electronic money application 29 and performs registration processing by recording this on the recharging registration DB (step 55).

In this way, the registration processing about the recharging service is completed.

Figure 9:
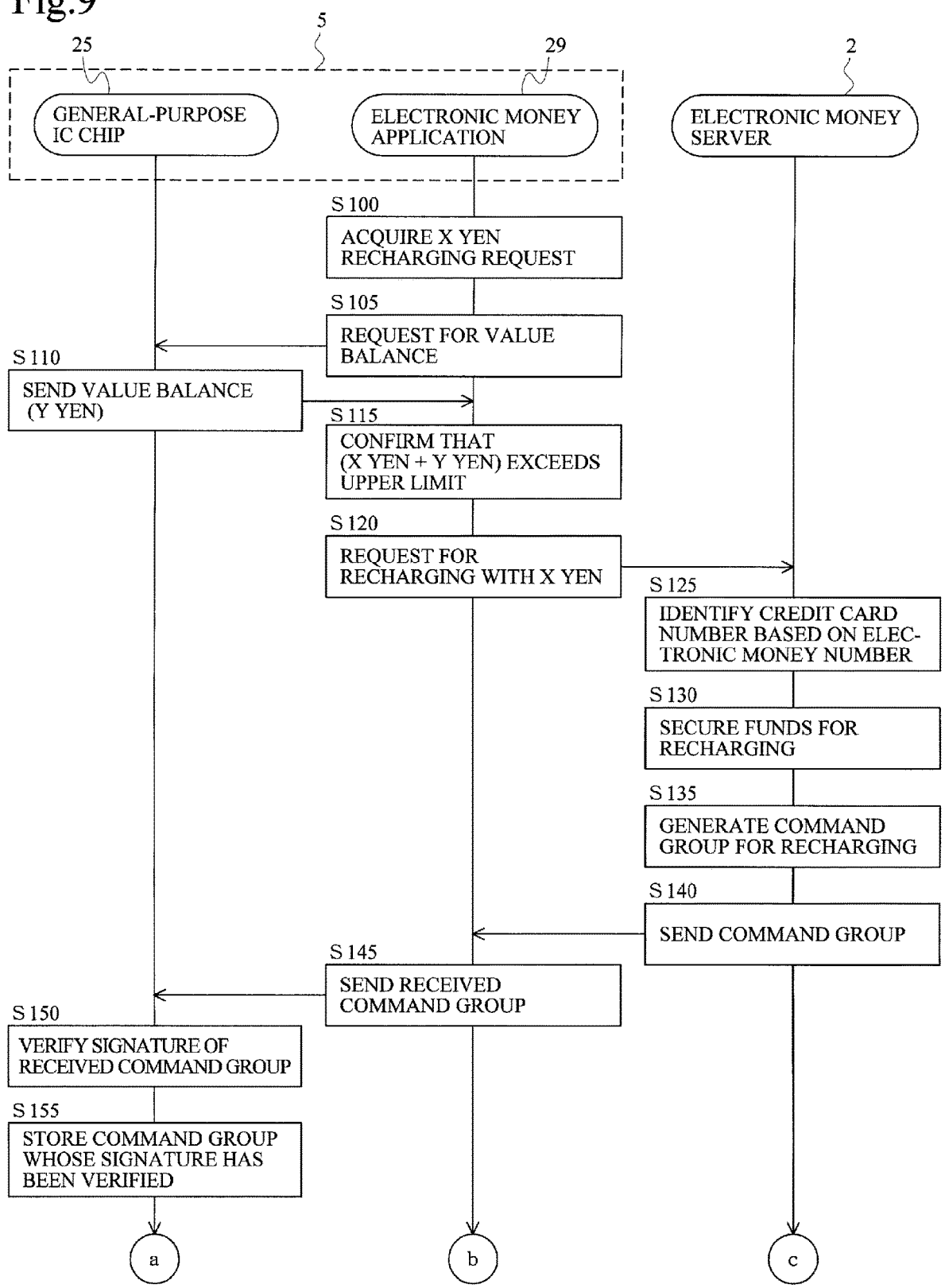
FIG. 9 is a flowchart depicting a processing procedure of a first embodiment.
Figure 10:
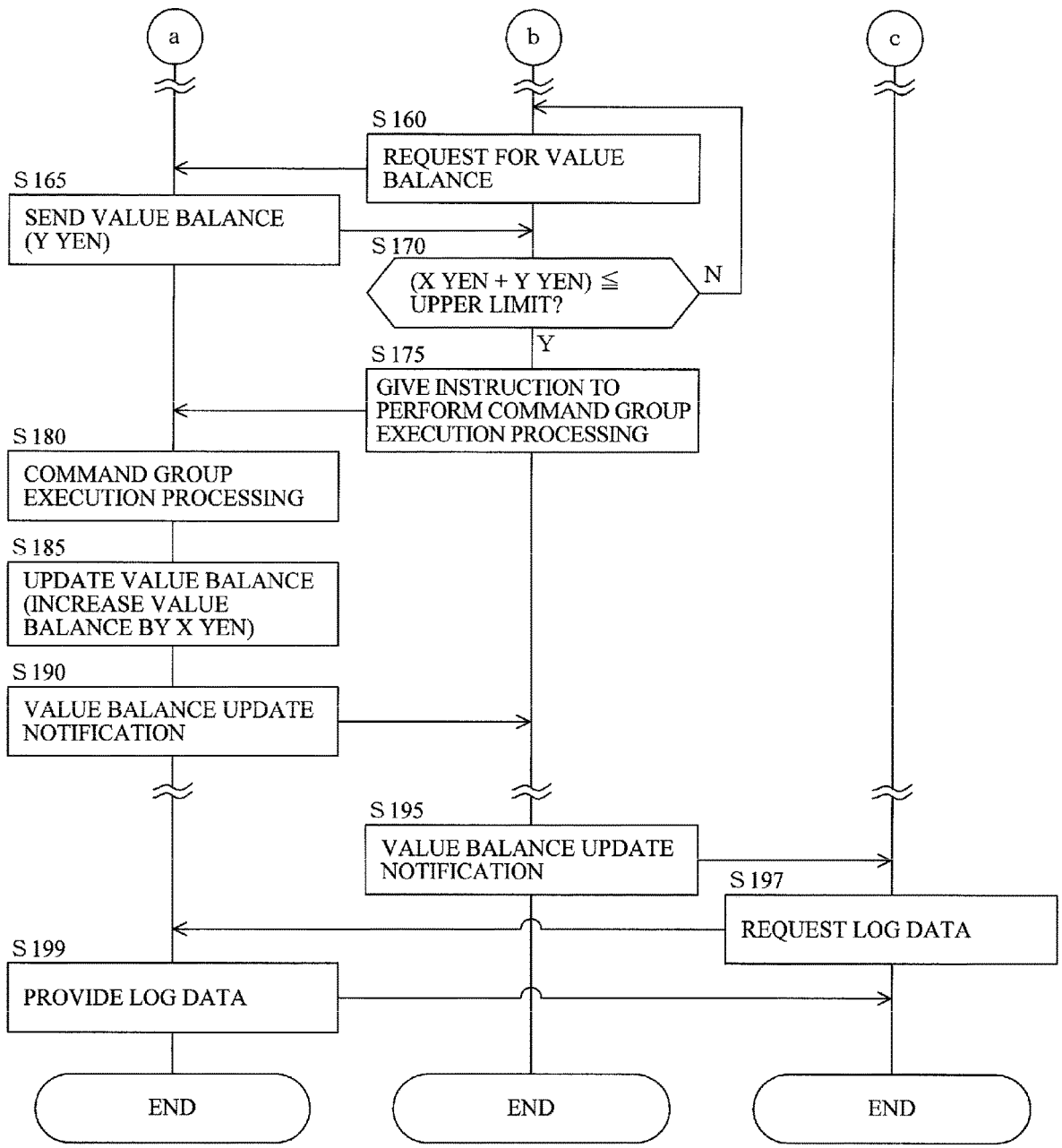
FIG. 10 is a flowchart depicting the processing procedure of the first embodiment.

FIG. 8 is a diagram depicting an example of a screen of a recharging request which is displayed on the screen of the mobile terminal 5, and FIGS. 9 and 10 are flowcharts for explaining the procedure of the recharging processing.

First, the electronic money application 29 displays a recharging request screen as depicted in FIG. 8 in response to a request from the user. Here, it is assumed that the user selected "Please perform recharging immediately".

Then, as a result of the user clicking a "set" button 236, the electronic money application 29 receives, from the user, a request for recharging from the electronic money server 2 (step 100). At this time, the electronic money application 29 also receives the recharging amount (X yen) at the same time. However, when the recharging amount to be added by one recharging operation is set in advance, there is no need for this reception.

Then, the electronic money application 29 requests for notification of the value balance by inputting a balance reference command to the general-purpose IC chip 25 (step 105).

When accepting input of the balance reference command from the electronic money application 29, the general-purpose IC chip 25 reads the value balance (Y yen) from the storing section 27 and sends the value balance to the electronic money application 29 (step 110).

When acquiring the value balance from the general-purpose IC chip 25, the electronic money application 29 acquires a value obtained by adding it to the recharging request amount in step 100 and compares the value with a predetermined upper limit at which recharging can be performed. With this comparison, the electronic money application 29 confirms that (X yen+Y yen) exceeds the upper limit (step 115). Then, the electronic money application 29 stores this result in the RAM 13, for example. If (X yen+Y yen) does not exceed the upper limit, the electronic money application 29 performs recharging by processing similar to the existing processing.

Here, the upper limit is the highest value which each general-purpose IC chip can hold by recharging in the system of electronic money. This upper limit is provided in consideration of the risk of recharging a single general-purpose IC chip with an excessively large amount. For example, the upper limit is 20,000 yen or 50,000 yen.

If the upper limit is 50,000 yen, when the value balance is 42,000 yen and an attempt to perform recharging corresponding to 10,000 yen is made, the value obtained by addition exceeds the upper limit, which makes it impossible to perform recharging. In this example, although the selection which says "Please perform recharging immediately" is received from the user, since the value obtained by addition exceeds the upper limit, it is assumed that recharging cannot be performed immediately.

Next, the electronic money application 29 accesses the electronic money server 2 and requests for recharging with the amount received in step 100 and sends an electronic money number to the electronic money server 2 (step 120). The electronic money application 29 acquires this electronic money number concurrently with the acquisition of the value balance.

Incidentally, when an overwriting command is used as the recharging command, in order to allow the electronic money server 2 to generate the overwriting command, the electronic money application 29 reads the value balance and sends the value balance to the electronic money server 2.

Moreover, in this embodiment, since the authentication processing is performed at the time of registration of recharging, authentication is not performed when recharging is actually performed, but a configuration may also be adopted in which authentication is performed by demanding an entry of a password every time recharging is performed.

The electronic money server 2 that has received the recharging request identifies the credit card number set by the user from the recharging registration DB by using the received electronic money number as a key (step 125).

Next, the electronic money server 2 secures the funds for recharging based on the credit card number thus identified (step 130). Specifically, based on the registered credit card number, the electronic money server 2 obtains approval of credit from the credit company server 300 or performs account transfer of an amount corresponding to the recharging amount from the bank account.

Then, the electronic money server 2 generates a command group for recharging and affixes an electronic signature thereto (step 135).

Here, an electronic signature is affixed in order to prove that the command group has been generated in the electronic money server 2 and has not been tampered.

Here, data included in the command group will be described. Examples of this command group include a command for acquiring data indicating the recharging amount and the current balance, a command for rewriting the balance to change it to "the current balance+the recharging amount"(by overwriting or addition), a rewriting confirmation command, and a log write command.

Next, the electronic money server 2 sends, to the electronic money application 29, a storage instruction that makes an IC chip store the generated command group (step 140).

The electronic money application 29 receives the storage instruction from the electronic money server 2 and transfers (inputs) this to the general-purpose IC chip 25 (step 145). At this time, if it has been determined in step 115 that recharging makes the value obtained by addition exceed the upper limit, the electronic money application 29 does not immediately perform recharging based on the command group at the same time and requests for temporary storage of the command group in the storing section 27. In this example, since the value obtained by addition exceeds the upper limit, the electronic money application 29 requests for temporary storage of the command group in the storing section 27.

When receiving the transfer of the storage instruction from the electronic money application 29, the general-purpose IC chip 25 verifies the electronic signature affixed thereto (step 150). After this verification, the general-purpose IC chip 25 temporarily stores the command group in the storing section 27 (step 155).

Here, command group execution processing will be described. As an example, first, the value balance is acquired from the general-purpose IC chip 25, rewriting of this value balance is performed by using this acquired value balance+ the recharging amount, and the value balance after rewriting is checked.

At this stage, the processing of this embodiment is temporarily ended. That is, recharging is not performed at this point in time, but a state in which immediate execution of recharging is possible if an instruction to perform recharging is given is created by design. Then, if an instruction to perform recharging is given, immediate recharging is made possible without a series of procedures in the previous stage for recharging.

Next, the electronic money application 29 requests for notification of the value balance by inputting the balance reference command to the general-purpose IC chip 25 at regular intervals (step 160). In response to this, the general-purpose IC chip 25 reads the value balance from the storing section 27 and sends the value balance to the electronic money application 29 (step 165).

Then, when acquiring the value balance (Y yen) from the general-purpose IC chip 25, the electronic money application 29 acquires a value obtained by adding it to the recharging request amount (X yen) received in step 100 and compares the value with a predetermined upper limit at which recharging can be performed (step 170).

As a result, if the value obtained by adding the value balance (Y yen) and the recharging request amount (X yen) received in step 100 falls below the upper limit (step 170; Y), the electronic money application 29 gives an instruction to execute the command group stored in step 155 and invalidate the command group (step 175). Here, a reduction in the value balance means that the value balance was used for some payment processing in this period. Moreover, as a mode of invalidation, deleting the data itself, making a predetermined invalidation flag effective, and the like are suitable.

Incidentally, if the value obtained by adding the value balance and the recharging request amount does not fall below the upper limit (step 170; N), the electronic money application 29 goes back to step 160 and requests the general-purpose IC chip 25 to provide notification of the value balance at regular intervals.

The general-purpose IC chip 25 that has received the instruction to execute the command group performs processing to execute the command group (step 180) and updates (increases) the value balance stored in the storing section 27 by an amount corresponding to X yen (step 185).

Then, the general-purpose IC chip 25 notifies the electronic money application 29 of the completion of the update of the value balance (step 190).

Then, the electronic money application 29 sends a value balance update notification to the electronic money server 2 (step 195), and the electronic money server 2 requests log data from the general-purpose IC chip 25 (step 197). In response to this, the general-purpose IC chip 25 sends the log data to the electronic money server 2 (step 199) and ends the processing.

In this example, when a recharging request was made, the user selected "Please perform recharging immediately", but, since immediate recharging was not possible due to the upper limit, the processing similar to processing performed when "Please prepare for recharging for the time being" was selected was performed.

In this example, the processing depicted in FIG. 9 is the stage of preparation for recharging and the processing depicted in FIG. 10 is the stage of execution of recharging.

By so doing, by performing the stage of preparation for recharging in advance, it is possible to perform recharging immediately when recharging is needed.

Here, the stage of preparation for recharging is performed based on the user's intention, that is, manually, and execution of recharging is carried out automatically.

Examples of a case where such an embodiment is useful include a case where it is expected in advance that payment exceeding the upper limit will be performed in a short period of time, specifically, a case where a purchase of a high-priced commodity and payment for many commodities and services are scheduled to be made.

Moreover, in this embodiment, since the command group is stored in the general-purpose IC chip 25 incorporated into the mobile terminal 5, even when the mobile terminal 5 is out of service and, like the game console and the tablet computer, does not have the function of performing radio communication on the base station antenna of the mobile telephone network, the command group execution processing (step 180) depicted in FIG. 10 is possible.

Therefore, when it is expected in advance that it will be difficult to perform recharging online, by performing the stage of preparation for recharging in advance, it is possible to perform recharging immediately when recharging is needed.

These examples are predicated on the automatic execution of recharging as depicted in the flowchart of FIG. 10, but, by adopting a configuration in which the electronic money application 29 performs the command group execution processing instruction in step 175 of FIG. 10 based on the input from the user, execution of recharging can also be carried out based on the user's intention (manually).

Moreover, examples include a case where a disabled state of the use of the value is desired until a specific time comes, for example, a preparation for an allowance which is set to be given on a given date. Furthermore, examples include a case where a waste of money is prevented. For example, examples are lunch money and return traffic expenses. In this example, in step 170 of FIG. 10, the electronic money application 29 determines whether the stored time has come or not, and, if the time has come, performs the command group execution processing instruction of step 175.

In this example, as depicted in FIG. 9, the stage of preparation for recharging may be started based on the user's intention (manually), but, as in automatic recharging, the stage of preparation for recharging may be started automatically under a certain condition. Also in this case, the electronic money application 29 determines whether the stored time has come or not, and, if the time has come, performs the command group execution processing instruction in step 175. That is, recharging is performed automatically, not based on the user's intention (manually).

Next, a second embodiment will be described.

Figure 11:
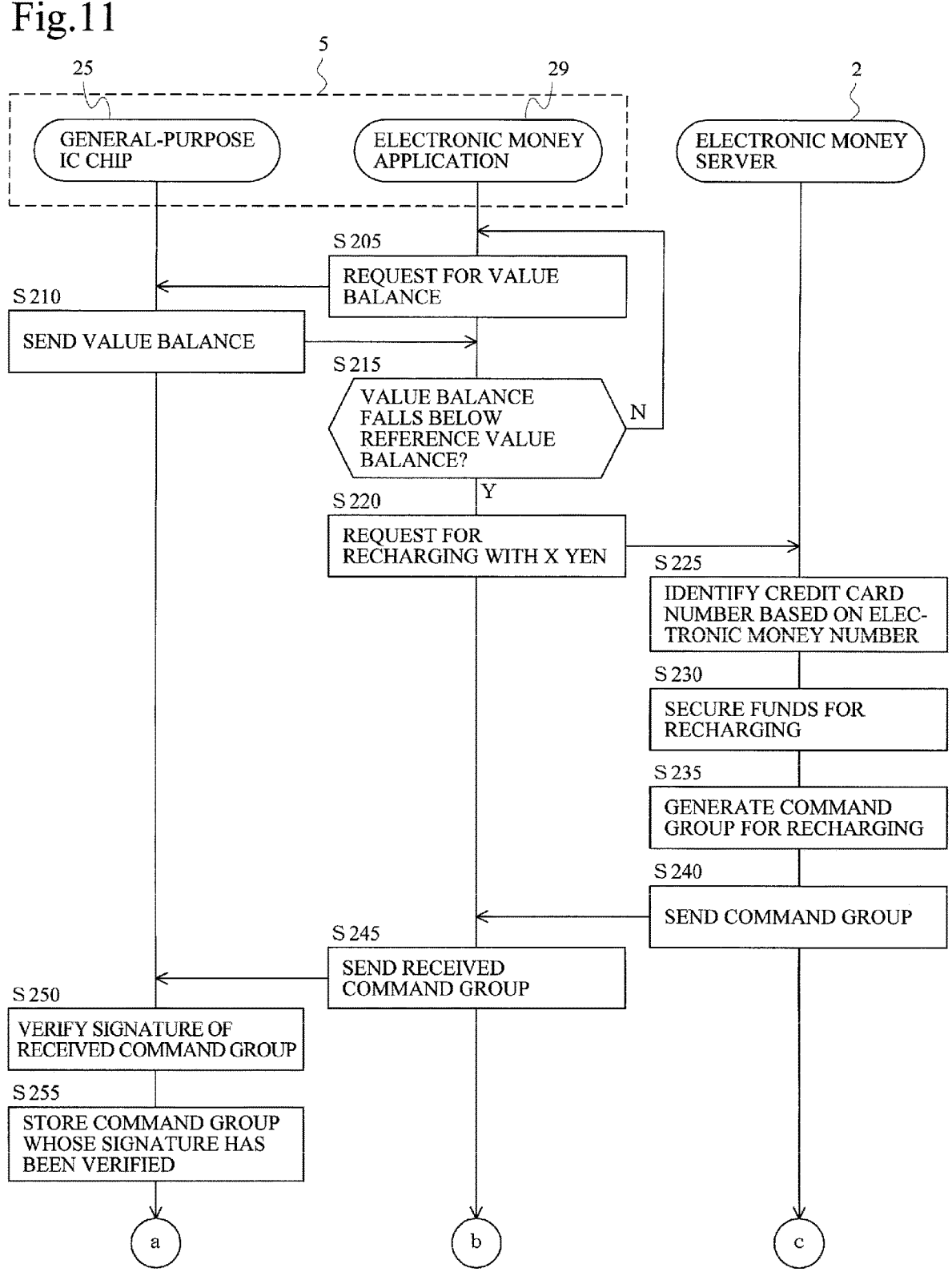
FIG. 11 is a flowchart depicting a processing procedure of a second embodiment.
Figure 12:
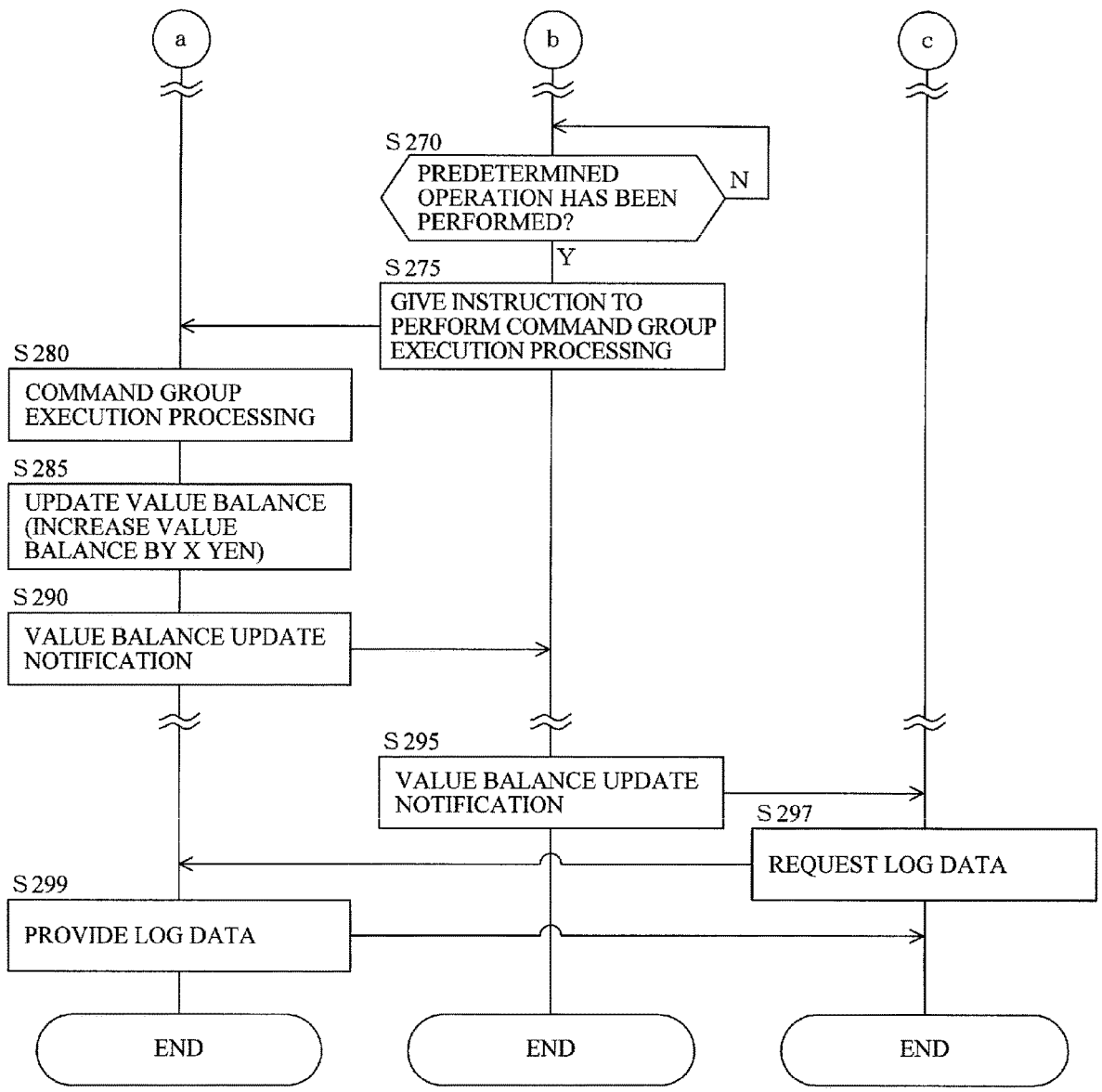
FIG. 12 is a flowchart depicting the processing procedure of the second embodiment.

FIGS. 11 and 12 are flowcharts depicting the processing procedure of the second embodiment.

In this embodiment, the stage of preparation for recharging is performed automatically and the stage of execution of recharging is carried out based on the user's intention (manually).

The electronic money application 29 requests for notification of the value balance by inputting the balance reference command to the general-purpose IC chip 25 at regular intervals (step 205), and, in response to this, when the general-purpose IC chip 25 accepts the input of the balance reference command from the electronic money application 29, the general-purpose IC chip 25 reads the value balance from the storing section 27 and sends the value balance to the electronic money application 29 (step 210).

When acquiring the value balance from the general-purpose IC chip 25, the electronic money application 29 compares the value balance with the reference value balance and determines whether or not the value balance falls below the reference value balance (step 215). As a result, if the value balance does not fall below the reference value balance (step 215; N), the electronic money application 29 goes back to step 205 and continues checking the value balance.

On the other hand, if the value balance falls below the reference value balance (step 215; Y), the electronic money application 29 accesses the electronic money server 2 and requests for recharging with a predetermined amount and sends an electronic money number to the electronic money server 2 (step 220). The electronic money application 29 acquires this electronic money number concurrently with the acquisition of the value balance. Incidentally, the predetermined amount is a previously set amount to perform this processing automatically.

Incidentally, when an overwriting command is used as the recharging command, in order to allow the electronic money server 2 to generate the overwriting command, the electronic money application 29 reads the value balance and sends the value balance to the electronic money server 2.

Moreover, in this embodiment, since the authentication processing is performed at the time of registration of recharging, authentication is not performed when recharging is actually performed, but a configuration may also be adopted in which authentication is performed by demanding an entry of a password every time recharging is performed.

The electronic money server 2 that has received the recharging request identifies the credit card number set by the user from the recharging registration DB by using the received electronic money number as a key (step 225).

Next, the electronic money server 2 secures the funds for recharging based on the credit card number thus identified (step 230). Specifically, based on the registered credit card number, the electronic money server 2 obtains approval of credit from the credit company server 300 or performs account transfer of an amount corresponding to the recharging amount from the bank account.

Then, the electronic money server 2 generates a command group for recharging and affixes an electronic signature thereto (step 235).

Next, the electronic money server 2 sends, to the electronic money application 29, a storage instruction that makes the general-purpose IC chip 25 store the generated command group (step 240).

The electronic money application 29 receives the storage instruction from the electronic money server 2 and transfers (inputs) this to the general-purpose IC chip 25 (step 245).

At this time, the electronic money application 29 requests for temporary storage of the command group in the storing section 27.

When receiving the input of the command group of recharging from the electronic money application 29, the general-purpose IC chip 25 verifies the electronic signature affixed thereto (step 250). After this verification, the general-purpose IC chip 25 temporarily stores the command group in the storing section 27 (step 255).

At this stage, the processing of this embodiment is temporarily ended. That is, recharging is not performed at this point in time, but a state in which immediate execution of recharging is possible if an instruction to perform recharging is given is created by design. Then, if an instruction to perform recharging is given, immediate recharging is made possible without a series of procedures in the previous stage for recharging.

Next, the electronic money application 29 determines whether or not a predetermined operation from the user has been performed (step 270). The predetermined operation is, for example, the entry of a password, execution of fingerprint authentication, and so forth.

If the predetermined operation of the user has been performed (step 270; Y), the electronic money application 29 gives an instruction to execute the command group stored in step 255 and invalidate the command group (step 275). As a mode of invalidation, deleting the data itself, making a predetermined invalidation flag effective, and the like are suitable.

The general-purpose IC chip 25 that has received the instruction to execute the command group performs processing to execute the command group (step 280) and updates (increases) the value balance stored in the storing section 27 by an amount corresponding to X yen (step 285).

Then, the general-purpose IC chip 25 notifies the electronic money application 29 of the completion of the update of the value balance (step 290).

Then, the electronic money application 29 sends a value balance update notification to the electronic money server 2 (step 295), and the electronic money server 2 requests log data from the general-purpose IC chip 25 (step 297). In response to this, the general-purpose IC chip 25 sends the log data to the electronic money server 2 (step 299) and ends the processing.

In this second embodiment, since the stage of preparation for recharging is performed automatically, the processing is similar to automatic recharging, and only final execution of recharging is carried out based on the user's intention (operation). This makes it possible to ensure convenience by automatic recharging and, at the same time, avoid the risk of performing recharging without allowing the user to be concerned with the execution of recharging.

Next, a third embodiment will be described.

The feature of this third embodiment is that the command group received from the electronic money server 2 is stored on the side of the electronic money application 29, not in the general-purpose IC chip 25. This third embodiment is predicated on that the general-purpose IC chip 25 is locked. Here, being locked means that, in a mechanism in which the general-purpose IC chip 25 operates with a supply of power to the general-purpose IC chip 25, a supply of power to the general-purpose IC chip 25 is cut off.

By locking, it is possible to prevent the electronic money from being used when the mobile terminal 5 is lost or stolen. Incidentally, authentication by a predetermined personal identification number or the like is required to release the lock.

Figure 13:
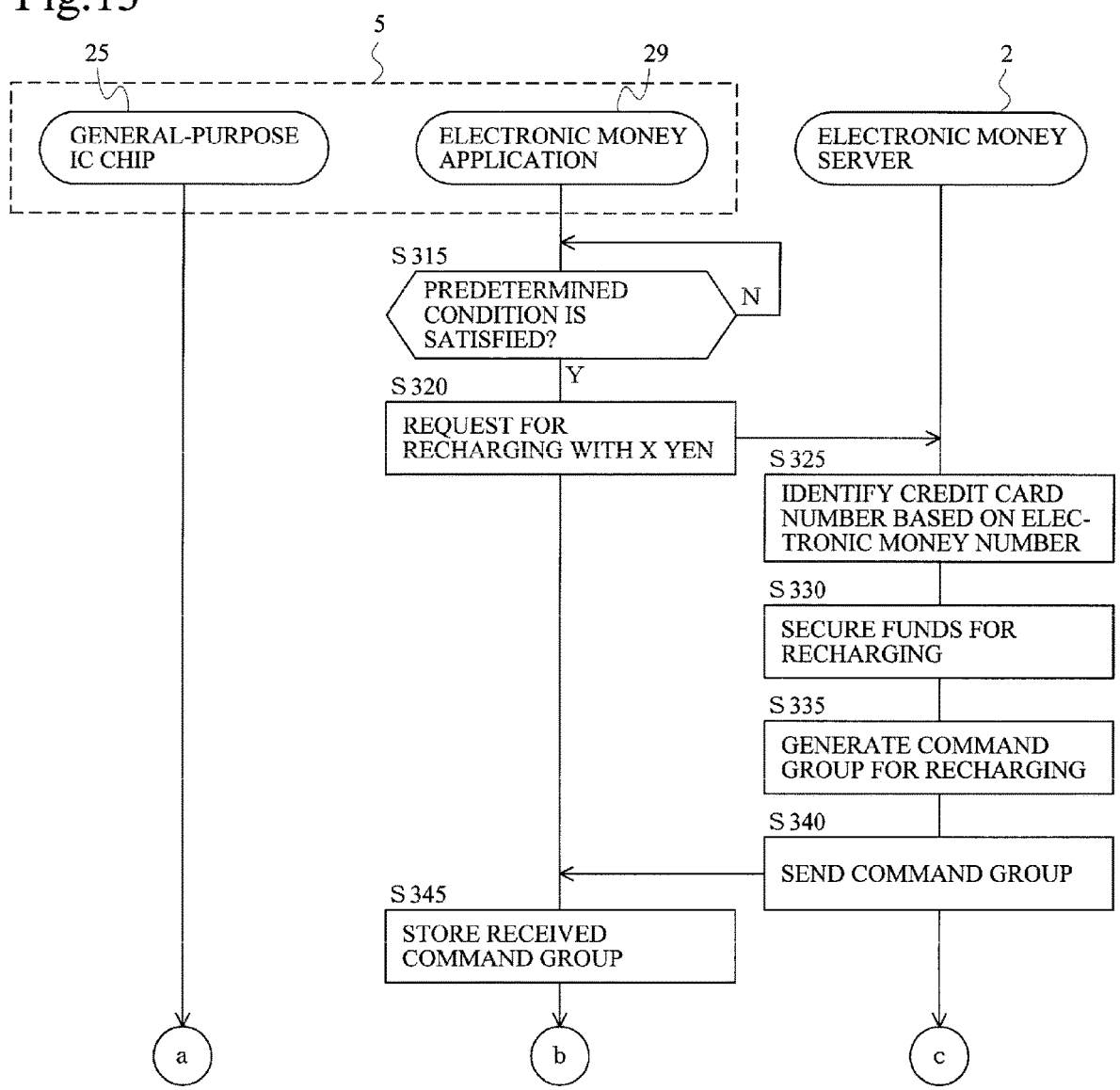
FIG. 13 is a flowchart depicting a processing procedure of a third embodiment.
Figure 14:
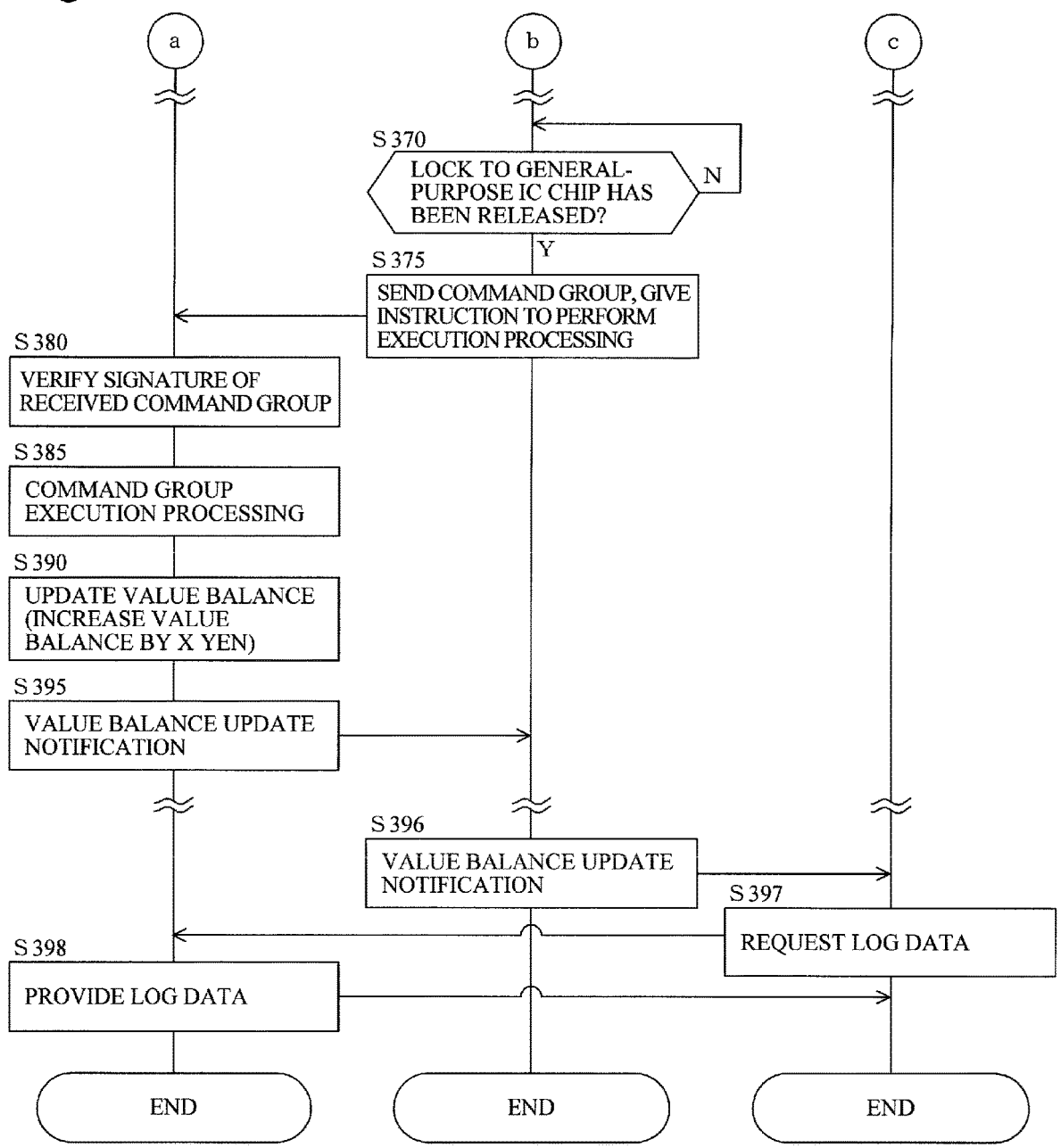
FIG. 14 is a flowchart depicting the processing procedure of the third embodiment.
Figure 15:
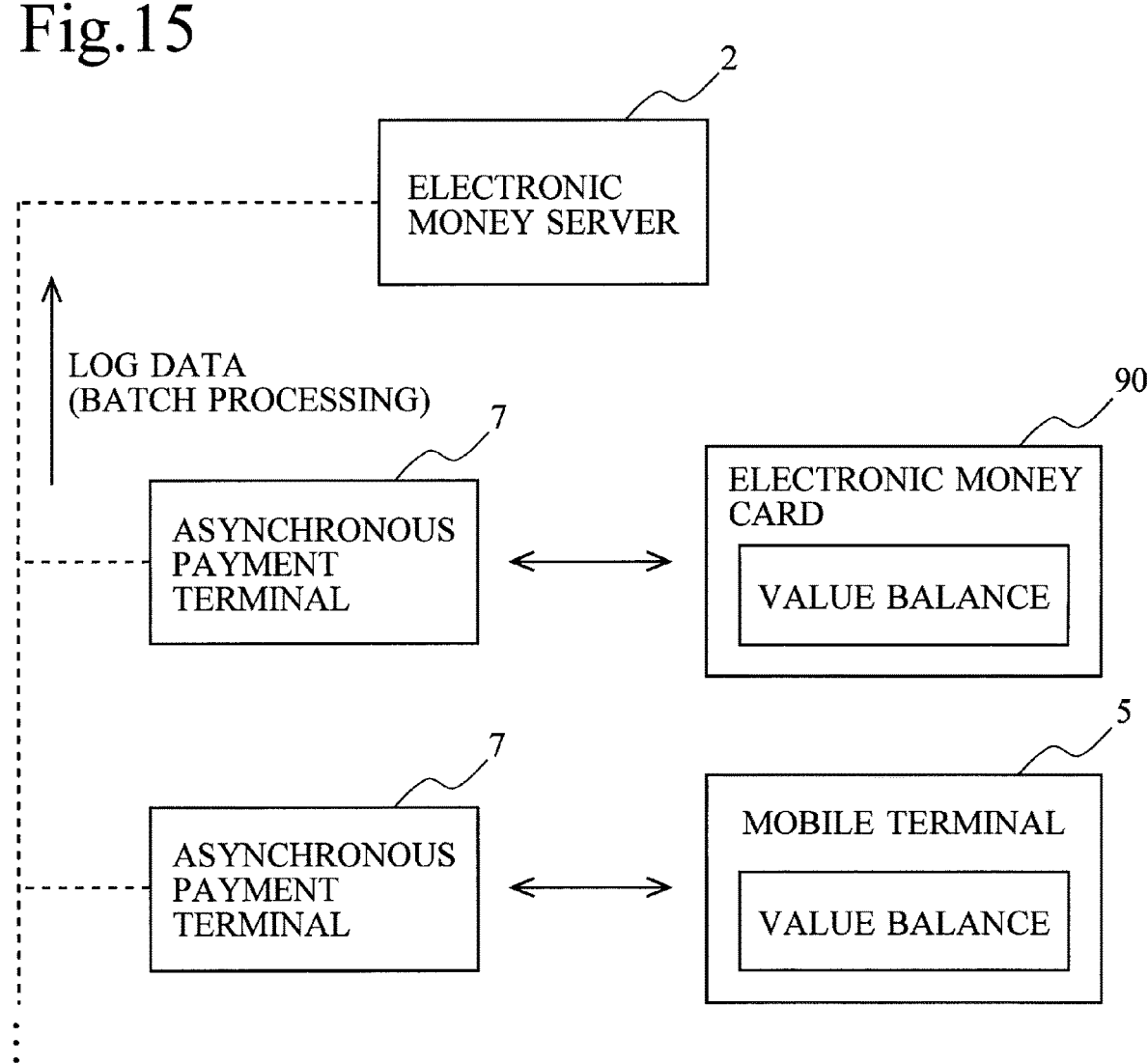
FIG. 15 is a diagram for explaining an existing electronic money system.

FIGS. 13 and 14 are flowcharts depicting the processing procedure of this third embodiment.

The electronic money application 29 determines whether or not a predetermined condition for starting recharging is satisfied (step 315). This predetermined condition is, for example, a condition that the value balance falls below the reference value balance.

As a result, if the predetermined condition is satisfied (step 315; Y), the electronic money application 29 accesses the electronic money server 2 and requests for recharging with a predetermined amount and sends an electronic money number to the electronic money server 2 (step 320).

The electronic money server 2 that has received the recharging request identifies the credit card number set by the user from the recharging registration DB by using the received electronic money number as a key (step 325).

Next, the electronic money server 2 secures the funds for recharging based on the credit card number thus identified (step 330).

Then, the electronic money server 2 generates a command group for recharging and affixes an electronic signature thereto (step 335).

Next, the electronic money server 2 sends, to the electronic money application 29, a storage instruction that makes the general-purpose IC chip 25 store the generated command group (step 340).

The electronic money application 29 receives the command group for recharging from the electronic money server 2 and attempts to transfer the command group to the general-purpose IC chip 25. However, if it is difficult to make the general-purpose IC chip 25 store the command group because, for example, the general-purpose IC chip 25 is locked, the electronic money application 29 stores this command group in the RAM 13 (step 345).

In this way, the stage of preparation for recharging which is performed automatically is completed. In this embodiment, unlike the first embodiment and the second embodiment, the received command group is not stored in the general-purpose IC chip 25. This is because the general-purpose IC chip 25 is locked and is in a state in which the general-purpose IC chip 25 does not operate.

Then, the electronic money application 29 monitors the locked state of the general-purpose IC chip 25 (step 370). Then, if a release of the locked state of the general-purpose IC chip 25 is detected (step 370; Y), the electronic money application 29 sends the command group stored in step 345 to the general-purpose IC chip 25 and gives an instruction to execute the command group and invalidate the command group (step 375). As a mode of invalidation, deleting the data itself, making a predetermined invalidation flag effective, and the like are suitable.

The general-purpose IC chip 25 that has received the instruction to execute the command group verifies the signature affixed to the command group (step 380). Then, the general-purpose IC chip 25 performs this execution processing (step 385) and updates (increases) the value balance stored in the storing section 27 by an amount corresponding to X yen (step 390). As described above, here, verification of the signature affixed to the command group is performed immediately before the processing to execute the command group.

Then, the general-purpose IC chip 25 notifies the electronic money application 29 of the completion of the update of the value balance (step 395).

Then, the electronic money application 29 sends a value balance update notification to the electronic money server 2 (step 396), and the electronic money server 2 requests log data from the general-purpose IC chip 25 (step 397). In response to this, the general-purpose IC chip 25 sends the log data to the electronic money server 2 (step 399) and ends the processing.

In this embodiment, the stage of preparation for recharging is performed automatically and, if the release of the lock to the general-purpose IC chip 25 is detected, prepared recharging is performed automatically. Therefore, since recharging is completed immediately after the lock to the general-purpose IC chip 25 is released for payment, it is possible to prevent payment from being impossible due to an insufficient value balance at the time of payment.

In this embodiment, examples of how the electronic money application 29 detects the release of the locked state of the general-purpose IC chip 25 include methods by which the electronic money application 29 attempts to access the general-purpose IC chip 25 at regular intervals, controls the lock/release of the general-purpose IC chip 25, and receives a lock release notification from an application of the mobile terminal 5.

In this third embodiment, at the stage of preparation for recharging, the command group received from the electronic money server 2 is stored in the electronic money application 29, not in the general-purpose IC chip 25. This processing can also be applied to the first embodiment and the second embodiment.

In the embodiments described above, the command group sent from the electronic money server 2 is temporarily stored and the stage of preparation for recharging is completed. However, there may be a case where recharging is not actually performed. For such a case, an expiration date may be provided for the command group and, if recharging is not performed prior to the expiration date, the command group may be invalidated and the funds may be returned to each financial institution.

When the mobile terminal 5, such as the game console or the tablet computer, which is not provided with the function of performing radio communication on the base station antenna of the mobile telephone network is used, for example, recharging reservation processing (from step 100 to step 155 of FIG. 9, from step 205 to step 255 of FIG. 11) may be performed by way of the wireless LAN at home, a workplace, or the like and recharging execution processing (from step 160 to step 190 of FIG. 9, from step 270 to step 290 of FIG. 11) may be performed on the go.

In the embodiments described above, the electronic money application 29 checks the value balance from the general-purpose IC chip 25. On the other hand, a configuration may also be adopted in which the electronic money server 2 checks the log at regular intervals, identifies an electronic money number whose value balance is smaller than or equal to a predetermined value or is smaller than the predetermined value and gives an instruction to the mobile terminal 5, for example, a smartphone, which corresponds to this identified electronic money number to check the balance by using the notification function thereof.

The mobile terminal 5 that has received this notification, the electronic money application 29 performs processing in accordance with step 205 and the steps that follow of the flowchart depicted in FIG. 11.

Such a configuration eliminates the need for the electronic money application 29 to monitor the general-purpose IC chip 25 at regular intervals and makes it possible to suppress exhaustion of a battery of the mobile terminal 5.

Moreover, as another example, when the recharging reservation processing (from step 100 to step 155 of FIG. 9, from step 205 to step 255 of FIG. 11) is performed, the electronic money application 29 displays an icon (for example, including words such as "10,000 yen recharging") indicating that it is related to this recharging reservation on the display screen of the mobile terminal 5. When there are a plurality of recharging reservations, a plurality of such icons may be displayed. This icon corresponds to a shortcut for starting the electronic money application 29.

Then, after the electronic money application 29 detects the user's operation performed on this icon, the electronic money application 29 performs the reserved recharging.

By doing so, it is possible to make the user recognize the existence of a recharging reservation reliably and perform the recharging with a simple operation.

Furthermore, as another example, when the recharging reservation processing (from step 100 to step 155 of FIG. 9, from step 205 to step 255 of FIG. 11) is performed, the electronic money application 29 displays notification data (for example, including words such as "10,000 yen recharging") related to this recharging reservation in a notification area of the mobile terminal 5. When there are a plurality of recharging reservations, a plurality of pieces of notification data may be displayed. It is desirable that this notification data includes a starting tag for starting the electronic money application 29.

Then, after the electronic money application 29 detects the user's operation performed on this notification data, the electronic money application 29 performs the reserved recharging.

By doing so, it is possible to make the user recognize the existence of a recharging reservation reliably and perform the recharging with a simple operation.

EXPLANATIONS OF LETTERS OR NUMERALS

1 electronic money system
2 electronic money server
3 the Internet
4 electronic money card
5 mobile terminal
6 payment terminal
7 asynchronous payment terminal
8 communication line
11 CPU
12 ROM
13 RAM
14 input section
15 output section
16 communication controlling section
17 short-distance communication controlling section
18 storing section
19 bus line
21 subscriber information IC chip
22 information processing section
23 storing section
25 general-purpose IC chip
26 information processing section
27 storing section
31 CPU
32 ROM
33 RAM
34 communication controlling section
35 storing section
36 bus line
90 electronic money card
300 credit company server

The invention claimed is:

1. A mobile terminal connected to an integrated circuit (IC) chip, the IC chip comprising:
  a balance storage configured to store a balance of an electronic value; and
  balance changer program code that causes the IC chip to perform change processing to change the stored balance by using a charge command group after the IC chip verifies that the charge command group has been generated by an information processing server, the charge command group being input to the IC chip by the mobile terminal, the mobile terminal comprising:
  at least one non-transitory memory operable to store program code; and
  at least one processor operable to read said program code and operate as instructed by said program code, said program code including:
    acquiring code configured to cause at least one of said at least one processor to request the information processing server to generate the charge command group and acquire the charge command group from the information processing server;
    storing code configured to cause at least one of said at least one processor to temporarily store the charge command group in a non-volatile storage for a time period until a preset condition is satisfied; and
    instructing code configured to cause at least one of said at least one processor to output, to the IC chip upon satisfaction of the preset condition, an execution instruction that causes the IC chip to execute the change processing by using the charge command group that has been stored in the non-volatile storage in advance for the time period,
  wherein the execution instruction is not output to the IC chip until the preset condition is satisfied.

2. The mobile terminal according to claim 1, wherein the instructing code is further configured to cause at least one of said at least one processor to invalidate the charge command group stored in the non-volatile storage after the change processing is executed.

3. The mobile terminal according to claim 1, wherein said program code further comprises:
  code configured to cause at least one of said at least one processor to perform locking of the IC chip; and
  releasing code configured to cause at least one of said at least one processor to release the locking of the IC chip.

4. The mobile terminal according to claim 1, wherein said program code further comprises:
  display code configured to cause at least one of said at least one processor to display an object related to an amount to be changed by the change processing, wherein
  the instructing code is further configured to cause at least one of said at least one processor to output the execution instruction to the IC chip at a time when a predetermined operation for the displayed object is detected.

5. The mobile terminal according to claim 1, wherein said program code further comprises:
  notification code configured to cause at least one of said at least one processor to cause a notification area display notification data including an amount to be changed by change processing using the charge command group, wherein
  the instructing code is further configured to cause at least one of said at least one processor to output the execution instruction to the IC chip at a time when a predetermined operation for the notification data displayed in the notification area is detected.

6. The mobile terminal according to claim 1, wherein the IC chip is further configured to store, in the non-volatile storage of the IC chip, log data including an execution result of the change processing and send the stored log data to the information processing server.

7. The mobile terminal according to claim 1, wherein the charge command group includes:
an addition amount to be added to the stored balance, a command that acquires the stored balance, and
a command that changes the stored balance to a value obtained by adding the addition amount to the acquired balance.

8. A method for controlling a mobile terminal connected to an integrated circuit (IC) chip, the method comprising:
storing, using the IC chip, a balance of an electronic value in a balance storage;
performing changing processing, using the IC chip, to change the stored balance by using a charge command group after the IC chip verifies that the charge command group has been generated by an information processing server, the charge command group being input to the IC chip by the mobile terminal;
requesting the information processing server to generate the charge command group and acquiring the charge command group from the information processing server;
temporarily storing the charge command group in a non-volatile storage for a time period until a preset condition is satisfied; and
outputting, to the IC chip upon satisfaction of the preset condition, an execution instruction that causes the IC chip to execute the change processing by using the charge command group that has been stored in the non-volatile storage in advance for the time period,
wherein the execution instruction is not output to the IC chip until the preset condition is satisfied.

9. A non-transitory computer-readable recording medium on which a program product is recorded to be executable by at least one processor of a mobile terminal,
wherein the mobile terminal is connected to an integrated circuit (IC) chip, the IC chip having a balance storage that stores a balance of an electronic value and performing change processing which changes the stored balance by using a charge command group after the IC chip verifies that the charge command group has been generated by an information processing server, the charge command group being input to the IC chip by the mobile terminal, and
wherein the program product causes the at least one processor of the mobile terminal to:
request the information processing server to generate the charge command group and acquire the charge command group from the information processing server;
temporarily store the charge command group in a non-volatile storage for a time period until a preset condition is satisfied; and
output, to the IC chip upon satisfaction of the preset condition, an execution instruction that causes the IC chip to execute the change processing by using the charge command group that has been stored in the non-volatile storage in advance for the time period, and
wherein the execution instruction is not output to the IC chip until the preset condition is satisfied.

10. The mobile terminal according to claim 1, further comprising the IC chip within the mobile terminal.

11. The mobile terminal according to claim 7, wherein an expiration date is provided for the command and, in response to recharging not being performed prior to the expiration date, the command becomes invalidated.

12. The mobile terminal according to claim 1, wherein the change processing is executed upon satisfaction of the preset condition, without accessing the information processing server.

13. The mobile terminal according to claim 1, wherein
the non-volatile storage is in the IC chip, the acquiring code is further configured to cause at least one of said at least one processor to acquire, from the information processing server, a storage instruction that causes the IC chip to store, in the non-volatile storage, the charge command group, and
the storing code causes at least one of said at least one processor to output the charge command group and the storage instruction to the IC chip.

14. The mobile terminal according to claim 13, wherein the preset condition comprises a condition that a value obtained by adding the stored balance and the recharging amount is less than or equal to an upper limit.

15. The mobile terminal according to claim 13, wherein the preset condition comprises a condition that a predetermined operation is performed on the mobile terminal by a user of the mobile terminal.

16. The mobile terminal according to claim 1, wherein
the non-volatile storage is in the mobile terminal,
the preset condition is a condition that a lock state of the IC chip is released, and
the program code further comprises transmission code configured to cause at least one of said at least one processor to transmit the charge command group stored in the non-volatile storage to the IC chip upon satisfaction of the preset condition, the change processing being executed by the IC chip by using the charge command group transmitted to the IC chip.

17. The mobile terminal according to claim 1, wherein the storage code is further configured to cause at least one of said at least one processor to, based on a determination that the charge command group cannot be stored in a non-volatile storage of the IC chip due to a lock state of the IC chip, store the charge command group in a non-volatile storage of the mobile terminal,
wherein the preset condition is a condition that the lock state of the IC chip is released, and
wherein the instructing code is further configured to causes at least one of said at least one processor to, based on a determination that the lock state of the IC chip is released, transmit the charge command group stored in the storage of the mobile terminal to the IC chip and output the execution instruction to execute the change processing to the IC chip.

* * * * *